(12) United States Patent
Pittman et al.

(10) Patent No.: US 7,899,781 B1
(45) Date of Patent: Mar. 1, 2011

(54) METHOD AND SYSTEM FOR SYNCHRONIZING A LOCAL INSTANCE OF LEGAL MATTER WITH A WEB INSTANCE OF THE LEGAL MATTER

(75) Inventors: John Scott Pittman, San Antonio, TX (US); William Caspar Campaigne, San Antonio, TX (US); Lindsay Ann Stevens, San Antonio, TX (US)

(73) Assignee: Liquid Litigation Management, Inc., San Antonio, TX (US)

( * ) Notice: Subject to any disclaimer, the term of this patent is extended or adjusted under 35 U.S.C. 154(b) by 642 days.

(21) Appl. No.: 11/580,438

(22) Filed: Oct. 13, 2006

(51) Int. Cl.
*G06F 17/00* (2006.01)
(52) U.S. Cl. .......... 707/610; 707/621; 707/635; 707/694
(58) Field of Classification Search .................. 707/610, 707/621, 635, 694
See application file for complete search history.

(56) References Cited

U.S. PATENT DOCUMENTS

| | | | |
|---|---|---|---|
| 6,128,620 A | 10/2000 | Pissanos et al. | |
| 6,188,329 B1 * | 2/2001 | Glier et al. | 707/104.1 |
| 6,430,581 B1 * | 8/2002 | Mahoney et al. | 715/205 |
| 2002/0032693 A1 | 3/2002 | Chiou et al. | |
| 2002/0161800 A1 | 10/2002 | Eld et al. | |
| 2002/0173975 A1 | 11/2002 | Leventhal | |
| 2002/0194014 A1 * | 12/2002 | Starnes et al. | 705/1 |
| 2003/0018520 A1 * | 1/2003 | Rosen | 705/12 |
| 2003/0112270 A1 | 6/2003 | Newell et al. | |
| 2003/0204430 A1 * | 10/2003 | Kalmick et al. | 705/8 |
| 2003/0208719 A1 * | 11/2003 | Fay, Jr. | 715/507 |
| 2003/0220806 A1 * | 11/2003 | Hoffman et al. | 705/1 |
| 2005/0086226 A1 * | 4/2005 | Krachman | 707/6 |
| 2005/0125282 A1 * | 6/2005 | Rosen | 705/11 |
| 2006/0129445 A1 * | 6/2006 | McCallum, Jr. | 705/8 |
| 2007/0048703 A1 * | 3/2007 | Rosen | 434/235 |
| 2007/0150299 A1 * | 6/2007 | Flory | 705/1 |
| 2008/0140721 A1 * | 6/2008 | Kalmick et al. | 707/104.1 |

OTHER PUBLICATIONS

Ferguson, Robert, "Special Edition Using Microsoft SharePoint Portal Server", Aug. 2, 2002, Que, pp. 1-53.
English, Bill, "The Administrator's Guide to SharePoint Portal Server 2001", Jul. 11, 2002, Addison Welsey, pp. 1-16.
*Liquid Lit Manager*™ (LLM) marketing materials, issued Jun. 8, 2003; LLM Inc., San Antonio, Texas (4 pages).

* cited by examiner

*Primary Examiner* — Charles Kim
*Assistant Examiner* — Kurt Mueller
(74) *Attorney, Agent, or Firm* — Osha • Liang LLP

(57) ABSTRACT

In general, the invention relates to a client device. The client device includes a local data repository comprising a plurality of local case records associated with a local instance of a legal matter. The client device further includes a customization engine configured to display at least one of the plurality of local case records and a synchronization engine configured to synchronize the local instance of the legal matter with a corresponding web instance of the legal matter, wherein the web instance of the legal matter is located in a web data repository operatively connected to the client device.

20 Claims, 24 Drawing Sheets

FIG. 7D

| Row | DocID | Description | Date | Dates Begin | Dates End | Quick-Note | Headline | View | |
|---|---|---|---|---|---|---|---|---|---|
| 1 | 459 | NC & Java Challenges - Presentation | 01/06/1997 | Ms7 003269 | Ms7 003274 | △ Hot Document | Edit | Open | ☐ |
| 2 | 469 | E-mail from D. Cole to J. Ludwig, Et al; Re: Posi IE4 Thinking | 10/06/1997 | Ms7 004624 | Ms7 004625 | △ Hot Document Responsive Confidential Sensitive | Smoking Gun B | Open | ☐ |
| 3 | 479 | E-mail from B. Algaze to B. Slivka Et al; re: Microsoft Java Strategy | 01/06/1997 | Ms7 003269 | Ms7 030431 | △ Edit | Edit | Open | ☐ |
| 4 | 462 | E-mail from P. Vanitz to S. Balmer Et al, Re: PN deal - Confidential - atty client confidential | 06/18/1997 | Ms8 001052 | Ms8 001052 | △ Confidential | Redact author and line 3 | Open | ☐ |
| 5 | 465 | E-mail from D. Rosen re: Netscape engageme | 06/09/1995 | Ms98 0009693 | Ms98 0009693 | △ Sensitive | Smoking Gun | Open | ☐ |
| 6 | 466 | E-mail re: Internet (aka Web Windows) | 04/12/1995 | Ms98 0103579 | Ms98 0103580 | △ Hot Document Confidential Sensitive | Here is a Johnlu document | Open | ☐ |
| 7 | 461 | E-mail from B. Koszewski to A. Neault re: ISP Referral Rude Q's | 04/16/1998 | Ms98 0110109 | Ms98 0110111 | △ Hot Document Responsive | Edit | Open | ☐ |
| 8 | 467 | Slide of Microsoft's Share of the Browser Market Share of New Browser Users (According to Microsoft") | — | Ms99 0102629 | Ms99 0102629 | | Negligence claim, breach of contract, smoking gun document | Open | ☐ |

Discussion Threads

| Expand All | Collapse All | Summary View | Search These Discussions |

"E-mail from L. Bender to R. Shriram re: Microsoft activities in South America"

1 Thread, 1 Note

More Info

Showing 1 of 1

Documents 1 to 1 of 1

New Thread
Expand Threads
Hide Threads

Jump Last
New Note

Testing Thread *Created by spdemo spdemo on 09/19/2006 10:24:26 PM*
☐ Issues: IE4 and Windows 1: 09/19/2006 10:24:26 PM by spdemo spdemo (Public)   Reply Begin a discussion here

Discussion Threads

| Expand All | Collapse All | Summary View | Search These Discussions | | Documents 1 to 1 of 1 |

"E-mail from L. Bender to R. Shriram re: Microsoft activities in South America"

1 Thread, 1 Note                                              More Info    New Thread
                                                                            Expand Threads
                                                                            Hide Threads ☐ Testing Thread *Created by spdemo spdemo on 09/19/2006 10:24:26 PM*       Showing 2 of 2    Jump Last
   Issues:   IE4 and Windows                                                                  New Note 1: *09/19/2006 10:24:26 PM by spdemo spdemo (Public)*                                         *Reply*

Begin a discussion here

2: *09/19/2006 10:24:26 PM by Scott Pittman - replies to 1 (Public)*              *Reply   Edit   Remove*

Secondary discussion begins here.

METHOD AND SYSTEM FOR SYNCHRONIZING A LOCAL INSTANCE OF LEGAL MATTER WITH A WEB INSTANCE OF THE LEGAL MATTER

CROSS-REFERENCE TO RELATED APPLICATIONS

The present application contains subject matter that may be related to the subject matter in the following U.S. patent application, which is assigned to a common assignee: "SYSTEM AND METHOD FOR MANAGING LEGAL DOCUMENTS" (application Ser. No. 10/865,150) filed on Jun. 10, 2004.

BACKGROUND

Document management is a critical process for nearly every organization. This is especially true for law firms and related organizations that originate, handle, and distribute a large number of documents. Effective management, organization and utilization of such documents are of paramount importance in law firms in order to increase efficiency and share information between multiple users (e.g., attorneys, paralegals, legal assistants, etc.).

As technology has evolved, document management in law firms is increasingly done electronically. In many cases all documents that are related to a particular legal matter are stored in electronic form in a central repository. These documents may include electronic documents (e.g., text files, spreadsheets, etc.) and electronic copies of physical hard copies (i.e., physical documents that have been scanned into a computer and, in some cases, made electronically identifiable using Optical Character Recognition (OCR) (or a similar method)). The central repository may then be made available to users, via centralized access over a network. For example, the users may securely access the documents over the network.

SUMMARY

In general, embodiments of the invention relate to a client device. The client device includes a local data repository comprising a plurality of local case records associated with a local instance of a legal matter, a customization engine configured to display at least one of the plurality of local case records, and a synchronization engine configured to synchronize the local instance of the legal matter with a corresponding web instance of the legal matter, wherein the web instance of the legal matter is located in a web data repository operatively connected to the client device.

In general, embodiments of the invention relate to a method for managing legal documents. The method includes synchronizing a local instance of a legal matter on a client device with a corresponding web instance of the legal matter on a web data repository to obtain a synchronized local instance, receiving a request, by the client device, to display at least one of a plurality of local case records in the synchronized local instance, obtaining the at least one of the plurality of local case records, and displaying the at least one of the plurality of local case records on the client device using a customization engine.

In general, embodiments of the invention relate to a computer readable medium. The computer readable medium includes instructions causing a computer system to: synchronize a local instance of a legal matter with a corresponding web instance of the legal matter on a web data repository to obtain a synchronized local instance, receive a request to display at least one of a plurality of local case records in the synchronized local instance, obtain the at least one of the plurality of local case records, and display the at least one of the plurality of local case records using a customization engine.

Other aspects of the invention will be apparent from the following description and the appended claims.

DETAILED DESCRIPTION

Figure 1:
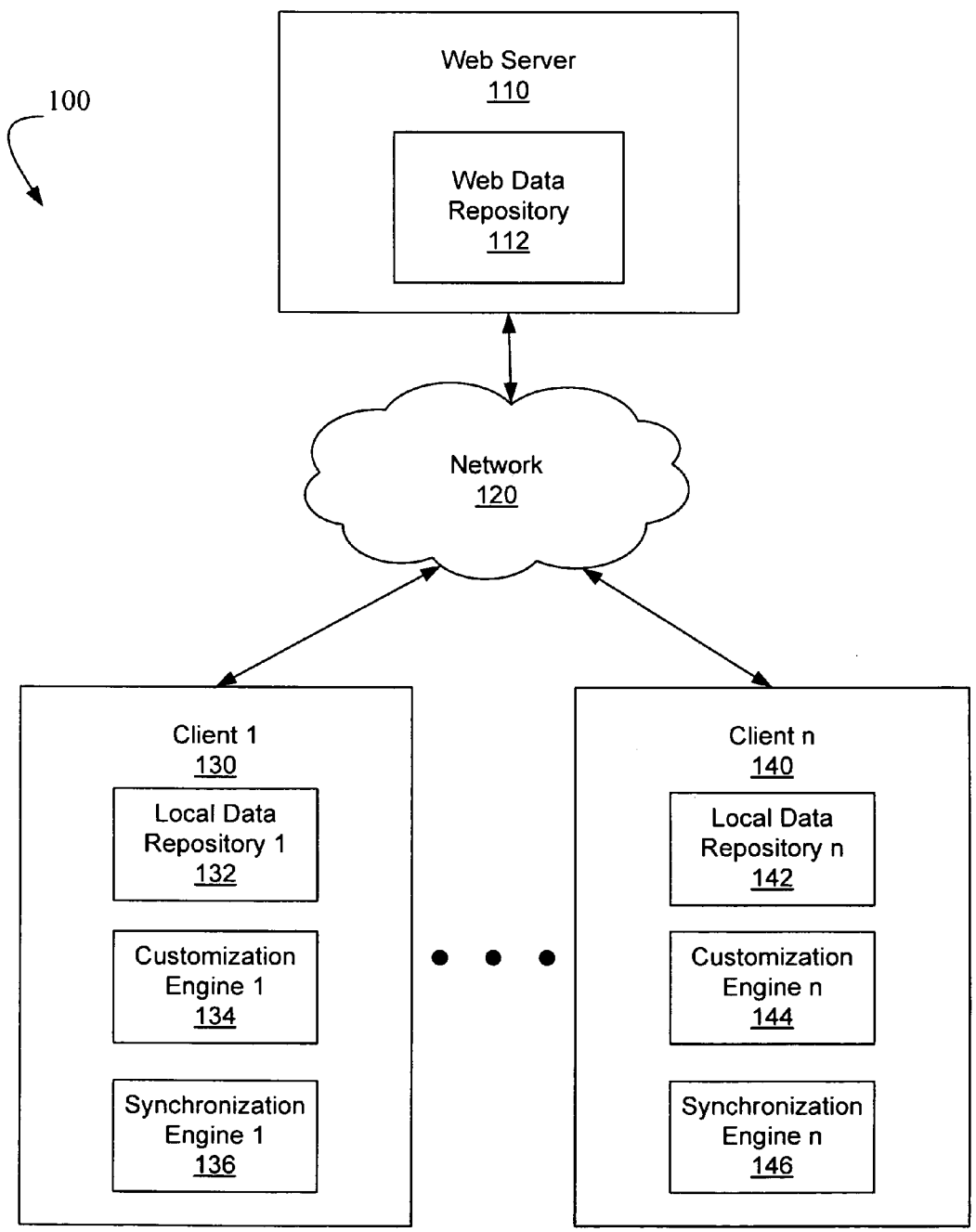
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a method and system for synchronizing a local instance of a legal matter with a web instance of the legal matter. More specifically, embodiments of the invention provide a method and system for bi-directional synchronization of legal documents and associated metadata tags between a local instance of a legal matter and a web instance of the legal matter. Further, embodiments of the invention provide a method and system to enable a user to customize the display of the legal documents and associated metadata tags.

In one embodiment of the invention, a legal matter corresponds to litigation, a negotiation, general legal advice, or any other matter involving an attorney. In one embodiment of the invention, the litigation may include, but is not limited to, a criminal trial, a civil trial, representing a party before an administrative agency (e.g., U.S. Patent and Trademark Office, Federal Trade Commission, etc.), etc. In one embodiment of the invention, if the legal matter is litigation, a potential user of the invention may be representing one or more parties in the litigation, consulting for one or more parties in the litigation, etc. In one embodiment of the invention, the negotiation may include, but is not limited to, settlement negotiations, arbitration, mediation, licensing, contract negotiation, etc. In one embodiment of the invention, general advice may include, but is not limited to, due diligence review for a merger, due diligence review for an acquisition, analysis of legal issues for the purposes of a legal opinion, etc.

FIG. 1 shows a system in accordance with one or more embodiments of the invention. The system (100) includes a web server (110) connected to one or more clients (130, 140) over a network (120). In one or more embodiments of the invention, the network (120) may correspond to a local area network (LAN), a wide area network (WAN), a public/private wired network where the clients (130, 140) are physically connected to web server (110), a wireless network, or any combination thereof.

In one or more embodiments of the invention, the web server (110) may correspond to a computer that is accessible over the network (120). In one embodiment of the invention, the web server (110) is configured to communicate with a client (130, 140) using one or more communication protocols (e.g., Transport Control Protocol (TCP), Internet Protocol (IP), User Datagram Protocol (UDP) etc.). Further, communication between the web server and client (130, 140) may be secured, e.g., using encryption, firewall(s), etc.

In one or more embodiments of the invention, the client (130, 140) may correspond to a communication device (e.g., a desktop computer, a laptop computer, a Personal Digital Assistant (PDA), a mobile phone, a tablet, etc.) arranged to communicate with the web server (110). In one embodiment of the invention, the client (130, 140) may include a graphical user interface (GUI) (not shown) (e.g., a web browser, a standalone software, application, etc.) to display information to provide a user (e.g., attorney, paralegal, assistant, etc.) and/or to allow the user to interact with the client (130, 140).

As shown in FIG. 1, the web server (110) includes a web data repository (112). In one embodiment of the invention, the web data repository (112) is configured to store data including web case records. In one embodiment of the invention, the web data repository (112) includes: (i) a storage medium (e.g., a hard disk drive, an optical storage device, etc) configured to store the aforementioned data and (ii) an interface to enable the client to request and retrieve the aforementioned data stored on the storage medium. While FIG. 1 shows the web data repository (112) within the web server (100), the web data repository (112) may alternatively be located outside of the web server (110). In such cases, the web data repository (112) is operatively connected to the web server (110) via a communication interface (not shown) (e.g., a wired interface, a wireless interface, etc). The web data repository (112) is described in further detail in FIG. 2 below.

As shown in FIG. 1, each client (130, 140) includes a local data repository (132, 142), a customization engine (134, 144), and a synchronization engine (136, 146). Each of the aforementioned components is discussed below.

In one embodiment of the invention, the local data repository (132, 142) stores data including local case records. In one embodiment of the invention, the local data repository (132, 142) includes: (i) a storage medium (e.g., a hard disk drive, an optical storage device, etc) configured to store the aforementioned data and (ii) an interface to enable the client to request and retrieve the aforementioned data stored on the storage medium. While FIG. 1 shows a local data repository (132, 142) within the client (130, 140), the local data repository (132, 142) may, alternatively, be located outside of the client (130, 140). In such cases, the client (130, 140) is operatively connected to the local data repository (132, 142) via a communication interface (not shown) (e.g., a wired interface, a wireless interface, etc). The local data repository (112) is described in further detail in FIG. 3 below.

In one embodiment of the invention, the customization engine (134, 144) is configured to retrieve and display local case records using layout and preference settings. The operation of the customization engine (134, 144) is described in further detail in FIG. 6 below.

In one embodiment of the invention, the synchronization engine (136, 146) is configured to synchronize data (e.g., case records, preference settings, layout settings, authentication information, user access permission files, menu tree files, files related to an indexed search, encryption certificate files, Cached, LastSyncTime, CurrentSyncTime, LegalMatterID, etc.) in the local data repository (132, 142) with the corresponding data in the web data repository (112). In one embodiment of the invention, one or more of the aforementioned datum (e.g., case records) is synchronized on a per-legal matter basis while other datum (e.g., user access permissions) is synchronized on a per-client basis. In one or more embodiments of the invention, the synchronization includes: (i) propagating changes made in the web data repository (112) to the local data repository (132, 142) and (ii) propagating changes made in the local data repository (132, 142) to the web data repository (112). In one or more embodiments of the invention, the synchronization engine (136, 146) is further configured to remind the client (130, 140) to synchronize with the web data repository (112). The synchronization process is described in further detail in FIGS. 5A and 5B.

In one embodiment of the invention, each client (130, 140) includes functionality to make changes to the content of the local data repository (132, 142). In one embodiment of the invention, the client (130, 140) may make changes to the content of the local data repository (132, 142) when the client (130, 140) is connected to the web server (110) or when the client is disconnected from the web server (110). Further, each client (130, 140) is configured to make changes to the content of the web data repository (112). In one embodiment of the invention, the client (130, 140) may make changes to the content in the web data repository (112) when the client (130, 140) is connected to the web server (110). In one embodiment of the invention, making changes to the content of the local data repository (132, 142) and/or the web data repository (112) includes inserting data, deleting data, or modifying.

In one embodiment of the invention, the system may include one web server and one or more clients. In this embodiment, the client may access its own local data repository and the web data repository but not access a local data repository on another client. Further, each client may synchronize its local data repository with the web data repository. In one embodiment of the invention, the one client may synchronize its local data repository with the local data repository of another client.

In one embodiment of the invention, the system may include multiple web servers each of which is hosting its own web data repository. In this embodiment, each of the clients may access one or more of the web servers and synchronize their local data repositories with the individual web data repositories. Further, each of the web data repositories may be synchronized with the other web data repositories in the system.

Figure 2:
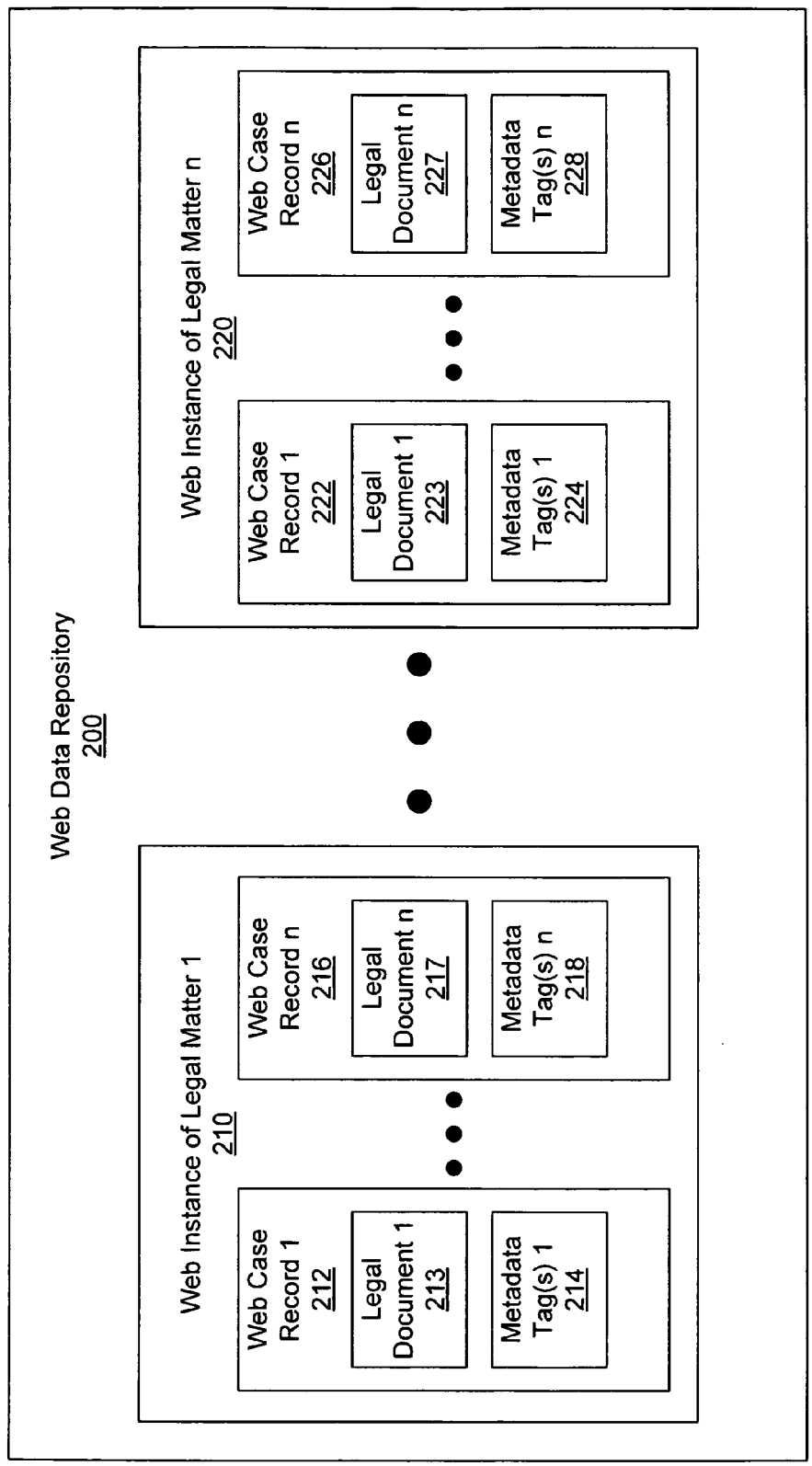
FIG. 2 shows a web data repository in accordance with one or more embodiments of the invention.

FIG. 2 describes a web data repository (200) in accordance with one or more embodiments of the invention. As described above, the web data repository (200) is configured to store various data (e.g., case records, preference settings, layout settings, authentication information, user access permission files, menu tree files, files related to an indexed search, encryption certificate files, CacheID, LastSyncTime, CurrentSyncTime, LegalMatterID, etc.). In one embodiment of the invention, one or more of the data is stored on a per-legal matter basis. For example, as shown in FIG. 2, each web case record (212, 216, 222, 227) is associated with a web instance of a legal matter (210, 220). In one embodiment of the invention, the web instance of a legal matter (210, 220) corresponds to all data (e.g., case records, preference settings, layout settings, user access permission files, menu tree files, files related to an indexed search, encryption certificate files, CacheID, LastSyncTime, CurrentSyncTime, LegalMatterID, etc.) associated with the legal matter, which is stored in the web data repository (220).

In one embodiment of the invention each legal matter is associated with a LegalMatterID. The LegalMatterID is a numeric string that uniquely identifies the legal matter. Alternatively, the LegalMatterID may be an alpha-numeric string or a string of alpha-characters.

As shown in FIG. 2, each web case record (210) corresponds to a case record stored in the web data repository (200). In one embodiment of the invention, each case record includes a legal document (213, 223, 217, 227) and associated metadata tag(s) (214, 224, 218, 228).

In one embodiment of the invention, a legal document (213, 223, 217, 227), corresponds to any type of document which is involved in a legal matter. Examples of legal documents include, but are not limited to, pleadings, declarations, deposition transcripts, expert reports, trial transcripts, motions, briefs, expert reports, legal memos, documents produced by a plaintiff in the legal matter, documents produced by a defendant in the legal matter, etc.

In accordance with one or more embodiments of the invention, metadata tag(s) (214, 224, 218, 228) correspond to informational attributes related to a legal document. Examples of metadata tags include, but are not limited to, party designation (e.g., plaintiff, defendant, etc), docket number, court filing date, a quick-note, a bates number, discussions, a description of the legal document, etc. In one embodiment of the invention, the quick-note includes one or more pre-defined designations which may be applied to the legal document, examples include: hot document, responsive, sensitive, and confidential. In one embodiment of the invention, a discussion includes a topic related to the legal document and one or more comments from one or more user about the aforementioned topic.

Figure 3:
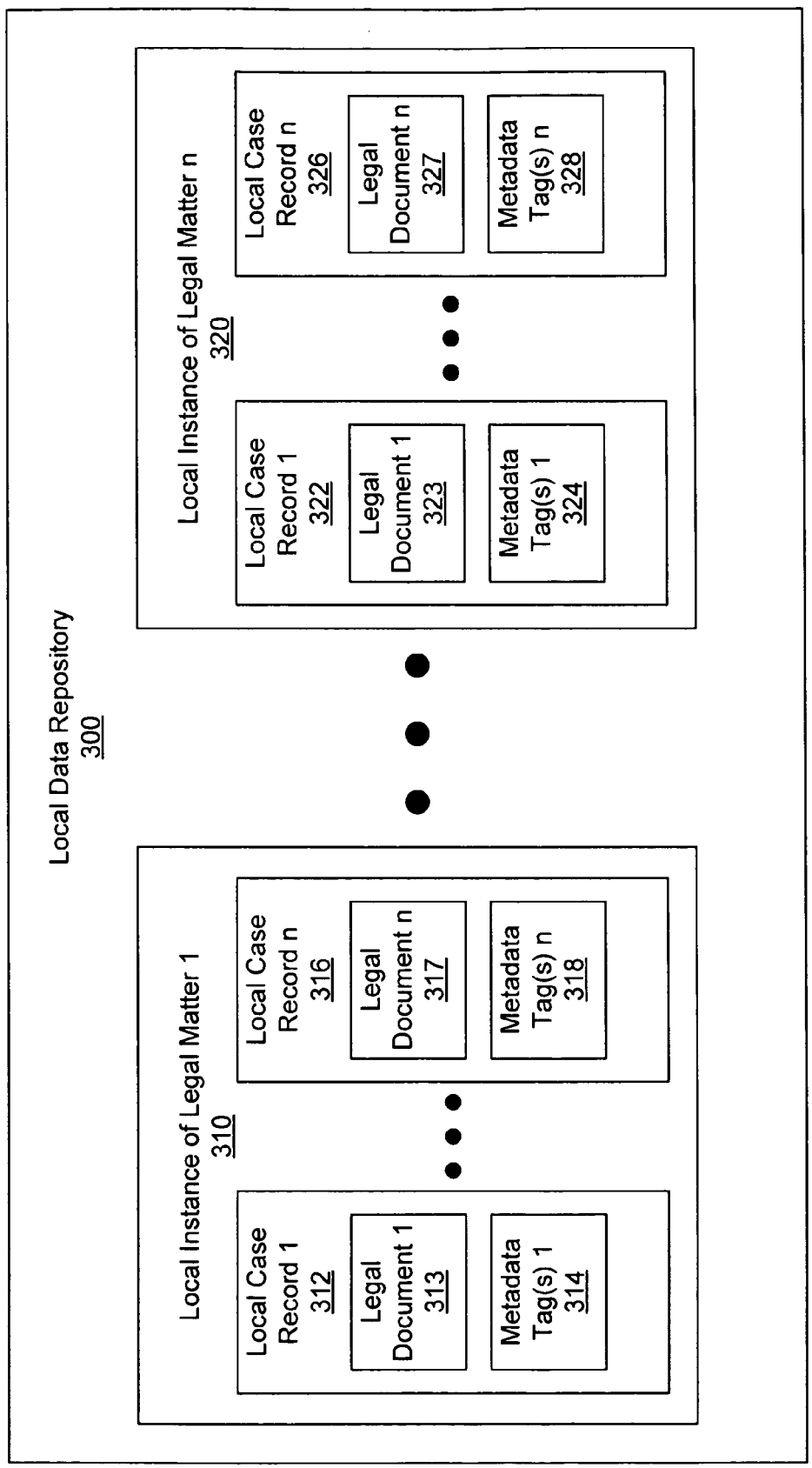
FIG. 3 shows a local data repository in accordance with one or more embodiments of the invention.

FIG. 3 describes a local data repository (300) in accordance with one or more embodiments of the invention. As described above, the local data repository (300) is configured to store various data (e.g., case records, preference settings, layout settings, authentication information, user access permission files, menu tree files, files related to an indexed search, encryption certificate files, CacheID, LastSyncTime, CurrentSyncTime, LegalMatterID, etc.). In one embodiment of the invention, one or more of the datum is stored on a per-legal matter basis. For example, as shown in FIG. 3, each local case record (312, 316, 322, 327) is associated with a local instance of a legal matter (310, 320). In one embodiment of the invention, the local instance of a legal matter (310, 320) corresponds to all data (e.g., case records, preference settings, layout settings, user access permission files, menu tree files, files related to an indexed search, encryption certificate files, CacheID, LastSyncTime, CurrentSyncTime, LegalMatterID, etc.) associated with the legal matter, which is stored in the local data repository (320).

As shown in FIG. 3, each local case record (310) corresponds to a case record stored in the local data repository (300). In one embodiment of the invention, each local case record includes a legal document (313, 323, 317, 327) and associated metadata tag(s) (314, 324, 318, 328).

In one embodiment of the invention, a legal document (313, 323, 317, 327), corresponds to any type of document which is involved in a legal matter. Examples of legal documents include, but are not limited to, pleadings, declarations, deposition transcripts, expert reports, trial transcripts, motions, briefs, expert reports, legal memos, documents produced by a plaintiff in the legal matter, documents produced by a defendant in the legal matter, etc.).

In accordance with one or more embodiments of the invention, metadata tag(s) (314, 324, 318, 328) correspond to informational attributes related to a legal document. Examples of metadata tags include, but are not limited to, party designation (e.g., plaintiff, defendant, etc), docket number, court filing date, a quick-note, a bates number, a description of the legal document, etc. In one embodiment of the invention, the quick-note includes one or more pre-defined designations which may be applied to the legal document, examples include: hot document, responsive, sensitive, and confidential. In one embodiment of the invention, a discussion includes a topic related to the legal document and one or more comments from one or more user about the aforementioned topic.

In one embodiment of the invention, there is a web instance and at least one local instance of each legal matter. Further, data in the web instance and each of the local instances of the legal matter may be modified (i.e., data is added, removed, and/or modified) by different users in parallel. For example, one user may change the web instance of the legal matter while another user (via a client) may change the local instance of the same legal matter. At a later point in time, the aforementioned web instance and one of the local instances of the legal matter may be synchronized. Those skilled in the art will appreciate that each of the local instances may be individual synchronized with the web instance.

Figure 4A:
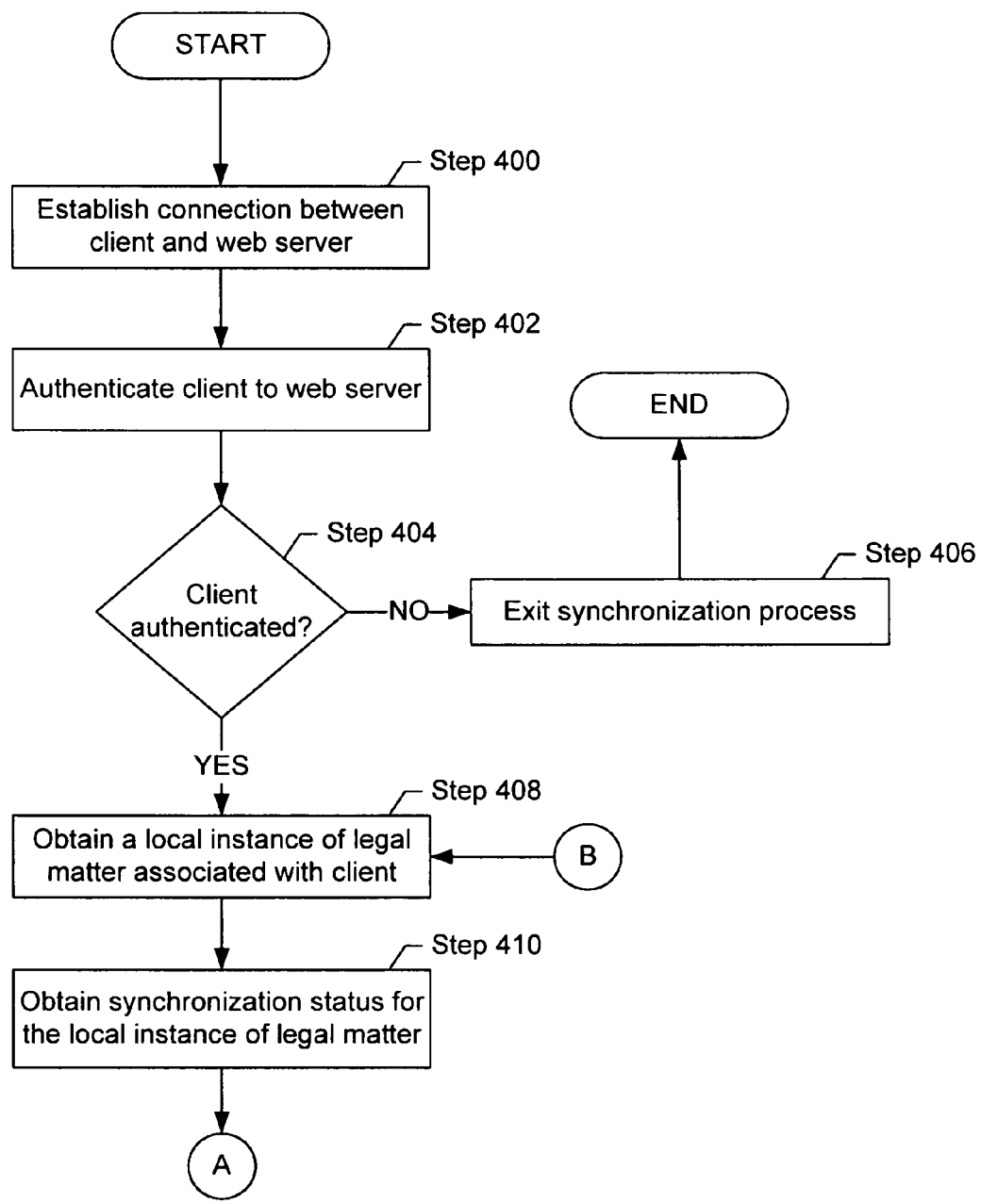
FIGS. 4A-6 show flowcharts in accordance with one or more embodiments of the invention.
Figure 4B:
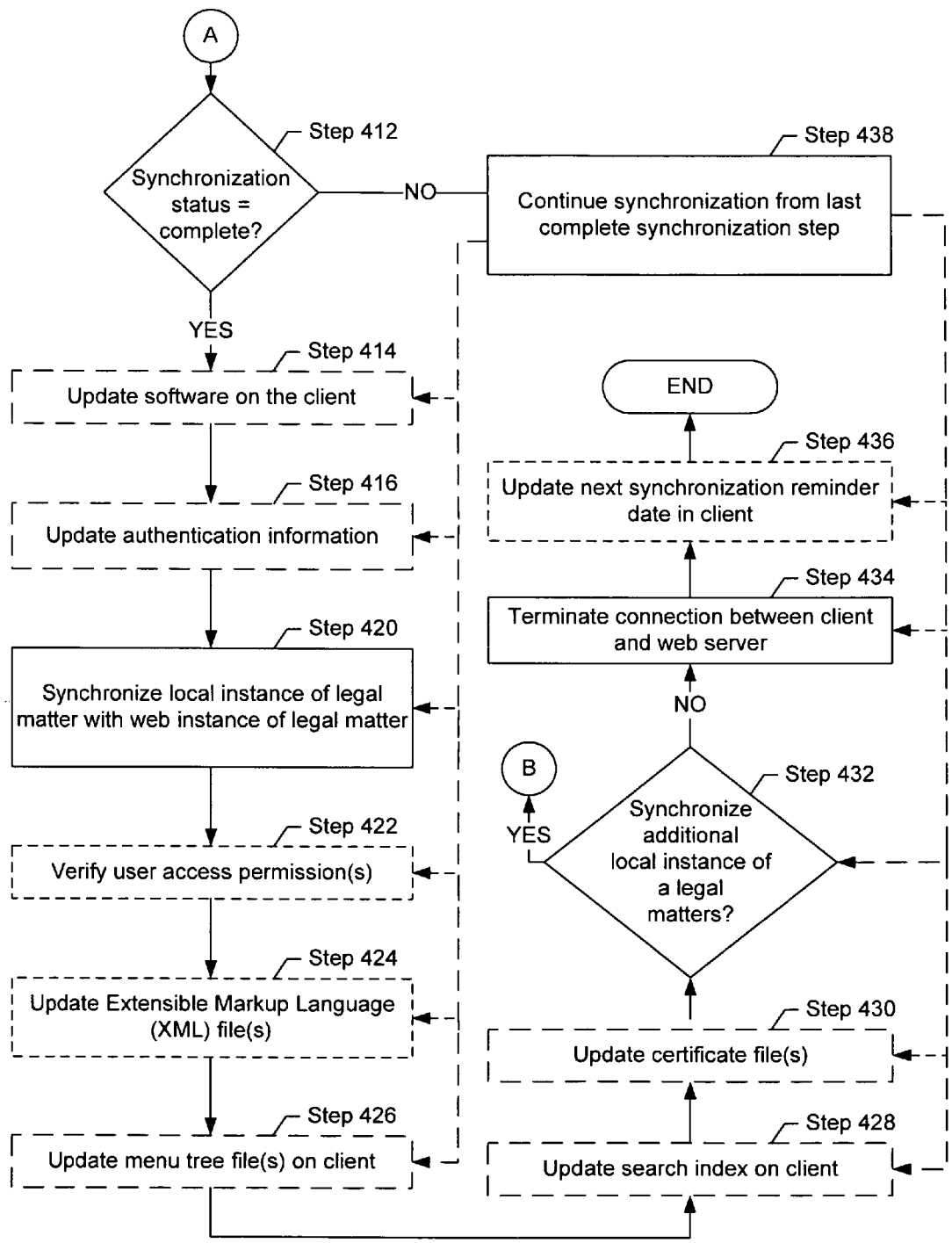

FIGS. 4A-4B show a flowchart in accordance with one or more embodiments of the invention. More specifically, FIGS. 4A-4B detail the process of synchronizing data in a local data repository and with corresponding data in a web data repository. In one embodiment of the invention, one or more of the steps discussed below may be omitted, repeated, and/or performed in a different order than the order shown in FIGS. 4A-4B. Accordingly, the specific arrangement of steps shown in FIGS. 4A-4B should not be construed as limiting the scope of the invention.

Initially, a connection is established between the client and the web server (Step 400). Once the connection is established, the client is authenticated to the web server (Step 402). In one embodiment of the invention, the client is authenticated to the server using one or more authentication information (e.g., username/password, secret question, personal identification number (PIN), etc.). If authentication is unsuccessful, the synchronization process is terminated (Step 406) and the process ends.

Alternatively, if authentication is successful, a local instance of a legal matter on the client is obtained (Step 408). In one embodiment of the invention, obtaining the local instance of a legal matter corresponds to selecting one of the local instances of legal matters on the client to synchronize. As discussed above, each legal matter is associated with a LegalMatterID, accordingly, once the local instance of the legal matter is selected the corresponding LegalMatterID is obtained. Next, a synchronization status on the local instance of the legal matter is obtained (Step 410). In accordance with one or more embodiments of the invention, the synchronization status of the local instance of the legal matter denotes whether the last synchronization of the local instance of the legal matter was fully-completed or if it was partially completed.

If the previous synchronization process on the local instance of the legal matter was fully-completed (Step 412), then a new synchronization process is initiated. Specifically, the process proceeds to Step 414. Alternatively, if the synchronization status indicates that the previous synchronization process of the local instance of the legal matter was partially completed (Step 412), then the process proceeds to the resume the synchronization process at the appropriate step in the synchronization process (Step 438). For example, if the synchronization status indicates that the last fully completed step in the previous synchronization process was Step 428, then the synchronization process would proceed to Step 430.

Continuing with the discussion of FIGS. 4A-4B, at Step 414, the software (or a portion thereof) associated with the present invention is updated on the client. In one embodiment of the invention, the aforementioned software on the client is updated if an update available on the web server. In accordance with one or more embodiments of the invention, this step is optional. Next, authentication information on the client is updated to reflect any changes made to the corresponding authentication information on the web server and authentication information on the web server is updated to reflect any changes made to the corresponding authentication information on the web client (Step 416). In one embodiment of the invention, the authentication information is associated with a user and/or the client (i.e., the physical device). In accordance with one or more embodiments of the invention, this step is optional.

Next, the local instance of the legal matter is synchronized with the web instance of the legal matter (Step 420). Synchronization of local instance of the legal matter with web instance of the legal matter is explained in further detail below in FIGS. 5A-5B.

Once Step 420 is completed, user access permission(s) are verified (Step 422). In one embodiment of the invention, user access permission(s) correspond to access rights (e.g., read, read/write, write, etc.) of a user (e.g., attorney, paralegal, legal assistant, etc.) to case records stored in the local data repository and the web data repository. Those skilled in the art will appreciate that the user access permissions may be specified any level of granularity (e.g., on a per-case record basis, on a per-legal matter basis, etc.). In accordance with one or more embodiments of the invention, this step is optional.

Next, extensible mark language (XML) files are updated on the client to reflect changes made to the corresponding XML files on the web server. In one embodiment of the invention, the XML files correspond to various files used by the customization engine. (see FIG. 6) Those skilled in the art will appreciate that other file formats may be used. In accordance with one or more embodiments of the invention, this step is optional.

Next, menu tree files are updated on the client to reflect changes made to the corresponding menu tree files (Step 426). In one or more embodiments of the invention, users interact with the local instance of the legal matter (or web instance of the legal matter) using a menu tree. A menu tree corresponds to a navigation mechanism which is displayed as a navigation window on the client system interface. The menu tree includes of a node-list (e.g., folders, sub-folders, files etc.) arranged in a tree-view (see e.g., FIG. 7C, reference notation 706). In one or more embodiments of the invention, this step is optional.

Next, files related to a search index associated with the local instance of the legal matter are updated to reflect changes made to the corresponding search index on the web server (Step 430). In one embodiment of the invention, the search index files correspond to a keyword file, which enables a user to perform a keyword search on the local instances of the legal matters. In one or more embodiments of the invention, this step is optional.

Next, certificate files on client are updated to reflect changes made to the corresponding certificates on the web server (Step 430). In one embodiment of the invention, certificate files correspond to files that are used to secure communication between the client and the web server. For example, certificate files may correspond to encryption keys, digital signatures, encryption algorithms, etc. In one or more embodiments of the invention, this step is optional.

At this stage, the synchronization of the local instance of the legal matter with the corresponding web instance of the legal matter, as identified in Step 408, is complete. A determination is then made about whether there are additional local instances of legal matters on the client to synchronize (Step 432). If there are additional local instances of legal matters to synchronize, then the process proceeds to Step 408. Alternatively, if there are no additional local instances of legal matters to synchronize, then the process proceeds to Step 434.

In Step 434, the connection between the client and web server is terminated. The next synchronization reminder date is subsequently set on the client. In one or more embodiments of the invention, a future date, calculated based upon a predetermined time interval, is stored as a reminder to update the local instance(s) of legal matter(s). In one embodiment of the invention, the reminder may be set of a per-legal matter basis, on a per-client basis, on a per-case record basis, or any combination thereof. In one or more embodiments of the invention, the future date may be provided by the user of the client. When the future date arrives, the client may automatically remind the user to perform synchronization. Alternatively, the client may automatically initiate synchronization when the future data arrives. In one or more embodiments of the invention, this step is optional. After step 436, the synchronization process ends. Those skilled in the art will appreciate that the client may initiate the aforementioned synchronization process at any time.

Figure 5A:
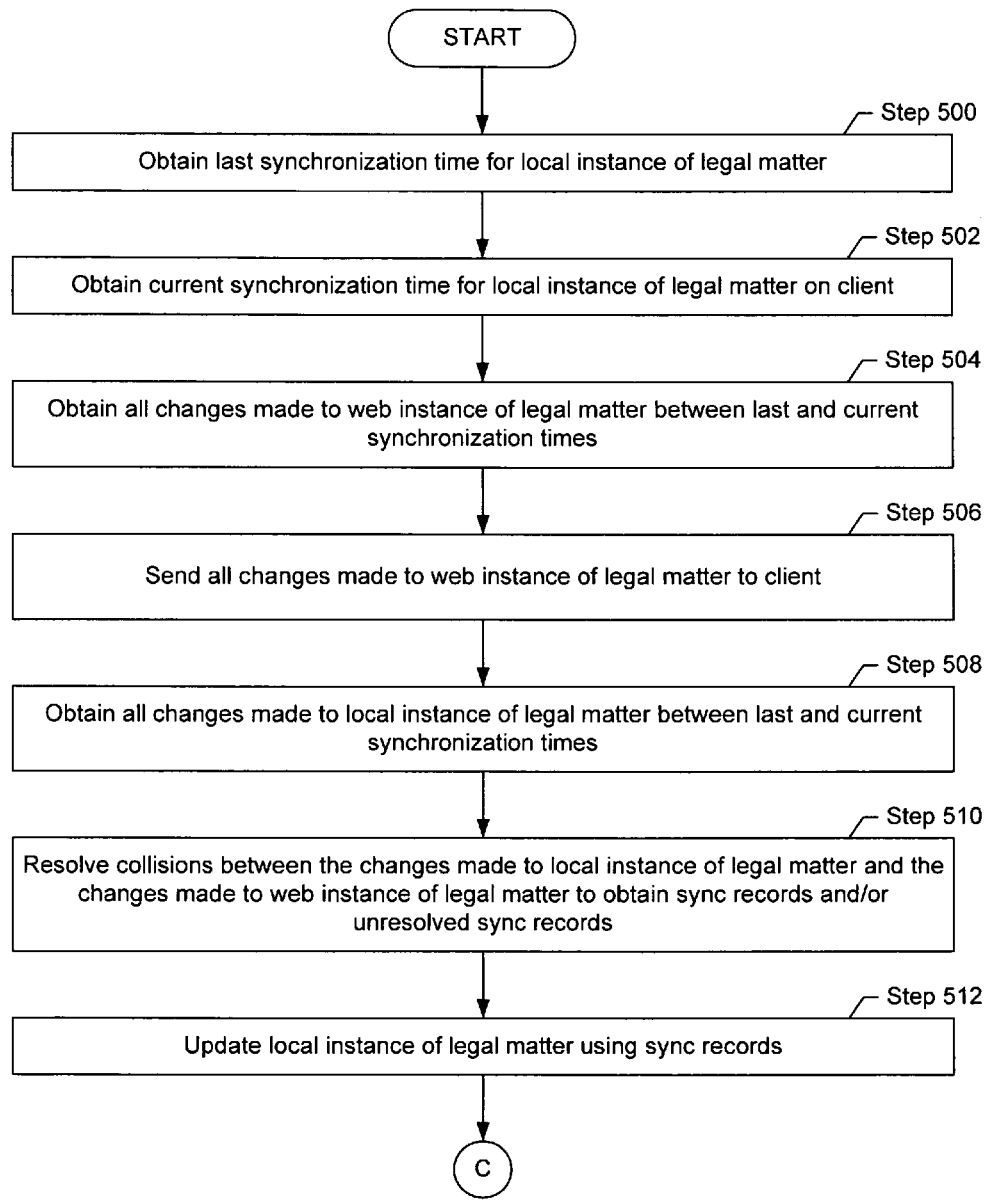
Figure 5B:
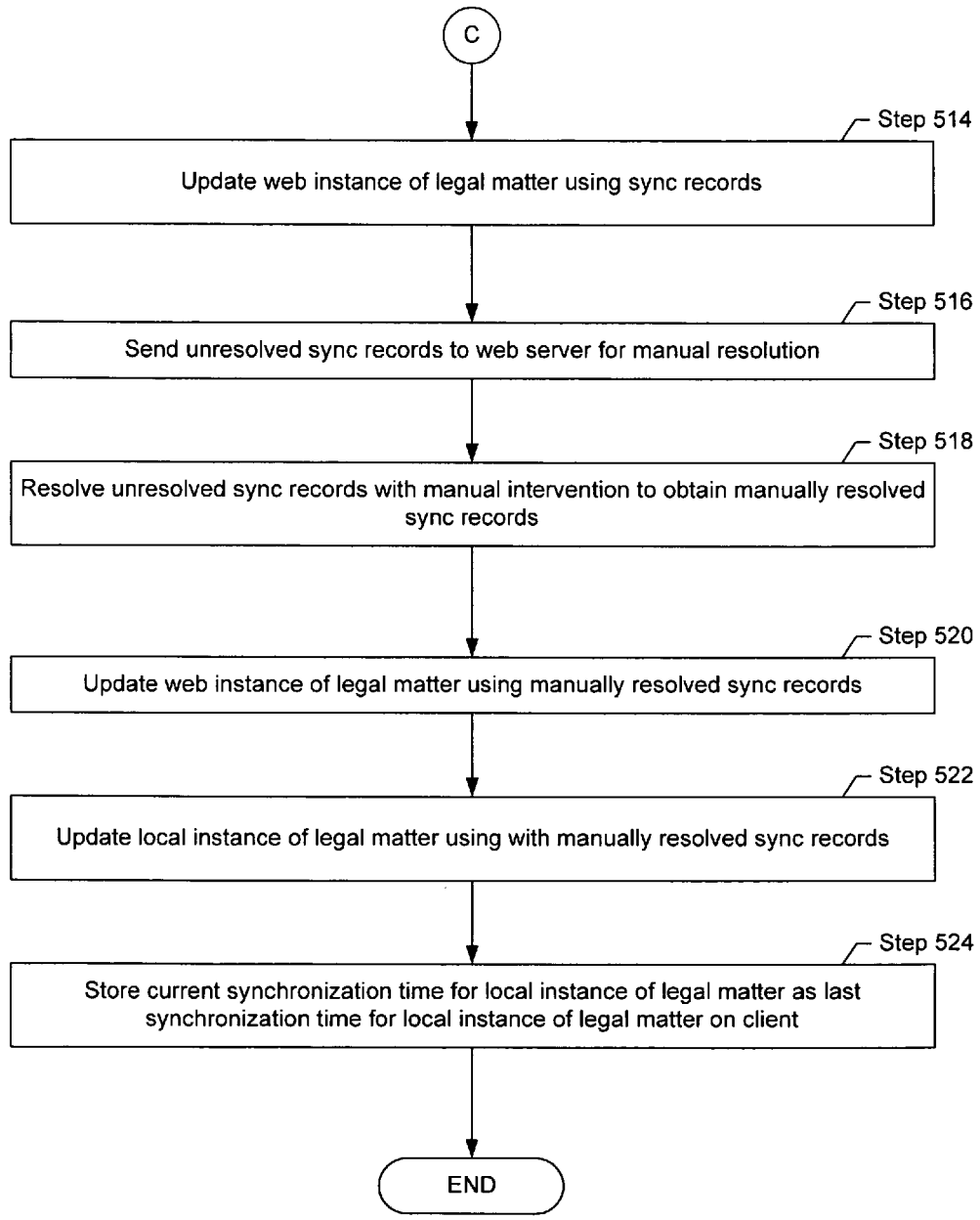

FIGS. 5A-5B show a flowchart in accordance with one embodiment of the invention. More specifically, FIGS. 5A-5B show a flowchart for synchronizing the local instance of a legal matter with a corresponding web instance of the legal matter. In one embodiment of the invention, one or more of the steps discussed below may be omitted, repeated, and/or performed in a different order than the order shown in FIGS. 5A-5B. Accordingly, the specific arrangement of steps shown in FIGS. 5A-5B should not be construed as limiting the scope of the invention.

Initially, a last synchronization time for the local instance of the legal matter is obtained (Step 500). In one or more embodiments of the invention, a LastSyncTime associated with the local instance of the legal matter tracks the last time the local instance of the legal matter was synchronized with the web instance of the legal matter. In one embodiment of the invention, LastSyncTime corresponds to the time (including date) when the Step 420 was completed.

Next, the current synchronization time for local instance of legal matter is obtained (Step 502). In one or more embodiments of the invention, a CurrentSyncTime associated with the local instance of the legal matter tracks the time on the client when starting synchronization is started. In one embodiment of the invention, CurrentSyncTime corresponds to the time (including date) when the Step 420 is initiated.

Next, all changes made to the corresponding web instance of the corresponding legal matter between the LastSyncTime and CurrentSyncTime are obtained. In one or more embodiments of the invention, the client passes LastSyncTime and CurrentSyncTime to the web server to obtain all changes made to the web instance of the legal matter (Step 504). Examples of changes to the web instance of the legal matter include insertion of a new web case record, modification of an existing web case record, deletion of an existing web case record, or any combination thereof. Further, modification of an existing web case record corresponds to changing the metadata tag(s) associated with the existing web case record. Changing the metadata tag(s) may include, adding a new metadata tag, removing an existing metadata tag, modifying an existing metadata tag, or any combination thereof. Once changes to the web instance of the legal matter are obtained, they are sent to the client (Step 506).

Next, all changes made to the local instance of the legal matter between LastSyncTime and CurrentSyncTime are obtained (Step 508). Examples of changes to the local instance of the legal matter include insertion of a new local case record, modification of an existing local case record, deletion of an existing local case record, or any combination thereof. Further, modification of an existing local case record corresponds to changing the metadata tag(s) associated with the existing local case record. Changing the metadata tag(s) may include, adding a new metadata tag, removing an existing metadata tag, modifying an existing metadata tag, or any combination thereof.

Once changes made to the local instance of the legal matter between LastSyncTime and CurrentSyncTime and changes made to the web instance of the legal matter between LastSyncTime and CurrentSyncTime are obtained, the aforementioned changes are analyzed to revolve collisions and to obtain sync records and/or and unresolved sync records (Step 510).

In one embodiment of the invention, a collision may occur if a web case record and a corresponding local case record have been independently modified Examples of collisions include: (i) local case record is modified and corresponding web case record is modified, (ii) local case record is modified and corresponding web case record is deleted, and (iii) local case record is deleted and corresponding web case record is modified.

In one embodiment a sync record corresponds to an action to be taken by the local data repository and/or the web data repository. The action either determined based on a collision resolution scheme or a simple update scheme. In one embodiment of the invention, the actions may include, but are not limited to, inserting a new case record, deleting an existing case record, modifying an existing case record, or any combination thereof. In one embodiment of the invention, modifying the case record may include changing the metadata tag(s) associated with the existing case record. The collision resolution scheme defines what action to perform to resolve a particular collision. The following two examples illustrate a collision resolution scheme in accordance with one embodiment of the invention. The examples are not intended to limit the scope of the invention.

Example 1

Consider the scenario in which "Document 100" includes a metadata tag of "to be reviewed" in all instances (i.e., the local instance and the web instance). Bob, in the web instance, modifies the metadata tag at 5 PM to "smoking gun" and Jane, in the local instance, and modifies the metadata at 6 PM to "no big deal." The above scenario results in a collision. In this scenario, the collision resolution scheme dictates that when there are two modifications to the same case record, the most recent modification prevails. Accordingly, the action is to modify the metadata in the web case record in the web instance to be consistent with the metadata in the corresponding local case record in the local instance.

Example 2

Consider the scenario in which "Document 100" includes a metadata tag of "to be reviewed" in all instances (i.e., the local instance and the web instance). Bob, in the web instance, deletes the case record in which Document 100 is located at 5 PM and Jane, in the local instance, and modifies the metadata at 6 PM to "no big deal." The above scenario results in a collision. In this scenario, the collision resolution scheme dictates that when there is a deletion and a modification applied to the same case record, the modification to the case record prevails. Accordingly, the action is to insert the local case record into the appropriate web instance of the legal matter. Note an insertion is required as the corresponding web case record was previously deleted from the web instance.

In one embodiment of the invention, the simple update scheme corresponds to actions to be taken when there is no collision (i.e., only one of the local case record and the web case record have been changed). In one embodiment of the invention, an unresolved sync record corresponds to a sync record which requires manual intervention from a user.

Continuing with the discussion of FIGS. 5A-5B, once sync records and/or unresolved sync records are obtained, the local instance of legal matter is updated using the sync records (or a portion thereof) (Step 512). In one embodiment of the invention, updating the local instance of the legal matter using the sync records corresponds to performing the action(s) listed in the sync record. Next, the sync records (or a portion thereof) are sent to the web server where they are used to update the web instance of the legal matter (Step 514).

The unresolved sync records are subsequently sent to the web server for manual resolution (Step 516). In one or more embodiments of the invention, the users which made the changes to the local instance of the legal matter and the web instance of the legal matter are notified for about the unresolved sync records.

The unresolved sync records are manually revolved to obtain manually resolved sync records (Step 518). The web instance of the legal matter is subsequently updated using the manually resolved sync records (or a portion thereof) (Step 520). The local instance of the legal matter is subsequently updated using the manually resolved sync records (Step 522). The current synchronization time for local instance of legal matter is stored as the last synchronization time for local instance of legal matter (Step 524).

In one embodiment of the invention, updating the web instance and the local instance of the legal matter in Steps 522 and Step 524 may include transferring web case records (or a portion thereof) to the client, transferring local case records (or a portion thereof) to the server, deleting web case records, deleting local case records, modifying web case records, and modifying local case records.

Figure 6:
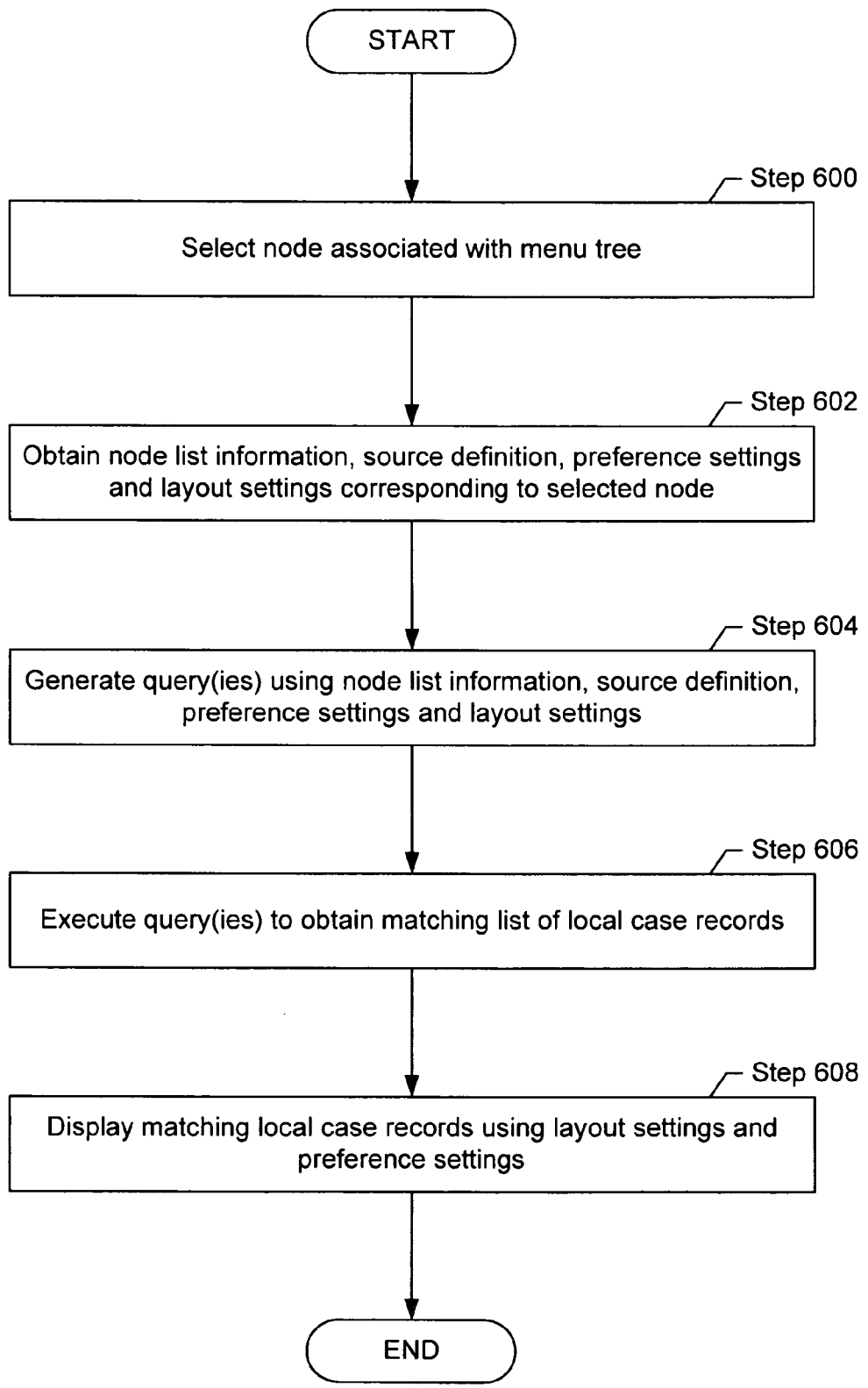

FIG. 6 shows a flowchart in accordance with one embodiment of the invention. More specifically, FIG. 6 shows a method for displaying local case records to a user in accordance with one or more embodiments of the invention. In one embodiment of the invention, one or more of the steps discussed below may be omitted, repeated, and/or performed in a different order than the order shown in FIG. 6. Accordingly, the specific arrangement of steps shown in FIG. 6 should not be construed as limiting the scope of the invention.

Initially, a user clicks on a node associated with a menu tree (Step 600). As described earlier, a menu tree corresponds to a node-list (e.g., folders, sub-folders, files etc.) arranged in a tree-view (see e.g., FIG. 7C, reference 706).

Once a node is selected from a menu tree, node list information, a source definition, preference settings and layout settings associated with the node are obtained (Step 602). In one or more embodiments of the invention, the node list information corresponds to information related to the selected node (e.g., parent node names, node values, etc.). In one or more embodiments of the invention, the source definition is used to generate restricting criteria for a query (e.g., the "where" clause in SQL), where the query is used to obtain local case records associated with the selected node.

In one or more embodiments of the invention, a layout setting defines how the local case records are displayed to a user. In one or more embodiments of the invention, layout settings may be obtained from an encoded file (e.g., an XML file). In one or more embodiments of the invention, different layout settings may be specified at any level of granularity (e.g., on a per-legal matter, per-client, per-case record basis, etc.).

In one or more embodiments of the invention, a preference setting defines which metadata tag(s) associated with a local case record are displayed to the user (e.g., attorney, paralegal, assistant, etc.), the number of local case records displayed per page, and the order in which the local case records are displayed.

Once the layout and preference setting are obtained, one or more queries (e.g., Structured Query Language (SQL) queries) are generated using the node list information, the source definition, the preference settings, and, optionally, the layout settings (Step 604).

The generated query(ies) is subsequently executed to obtain a list of matching local case records from the local data repository (Step 606). In one or more embodiments of the invention, the generated query and corresponding list of matching local case records may be cached on the client. In one or more embodiments of the invention, a CacheID may be associated with a generated query and corresponding listing of matching case records. In one embodiment of the invention, caching the generated query and/or the listing of matching local case records may decrease the processing time required to obtain the list of matching case records. In such cases, the cache may be queried prior to executing the generated query. The matching local case records are subsequently displayed to the user using the layout settings and preference settings (Step 608).

The following example illustrates an embodiment of the method described in FIG. 6. Those skilled in the art will appreciate that the following example provided for exemplary purposes only and accordingly should not be construed as limiting the scope of the invention in any way.

The following example, denoted as Example 3A-3E, describes how local case records shown in FIG. 7D are displayed when the "Production-Defendant-All" node is selected.

Figure 7A:
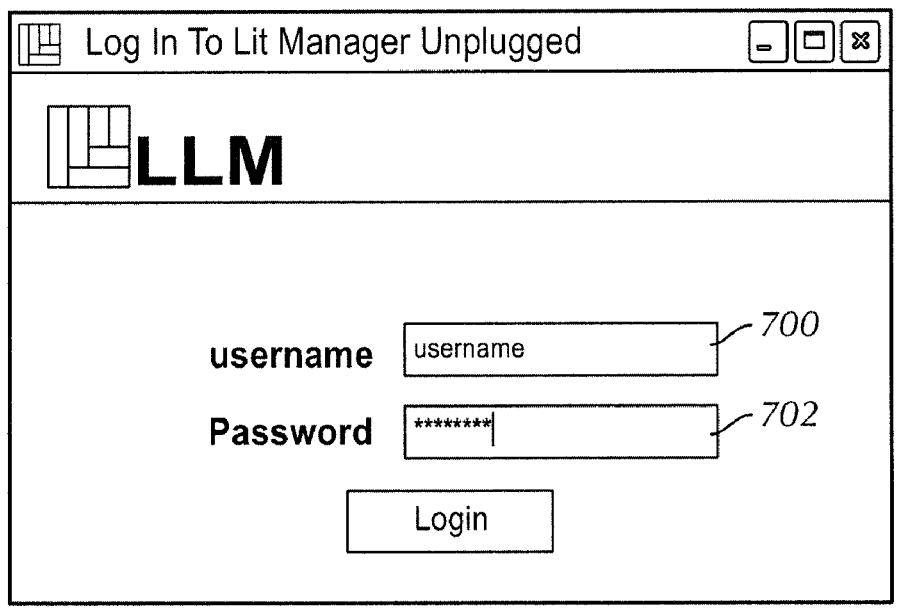
FIGS. 7A-7P show an example in accordance with one or more embodiments of the invention.
Figure 7B:
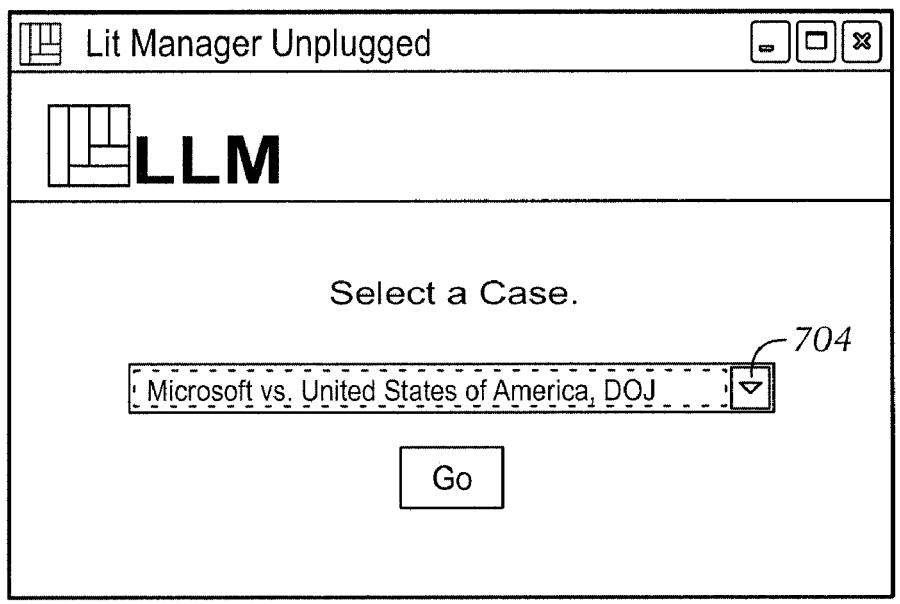
Figure 7C:
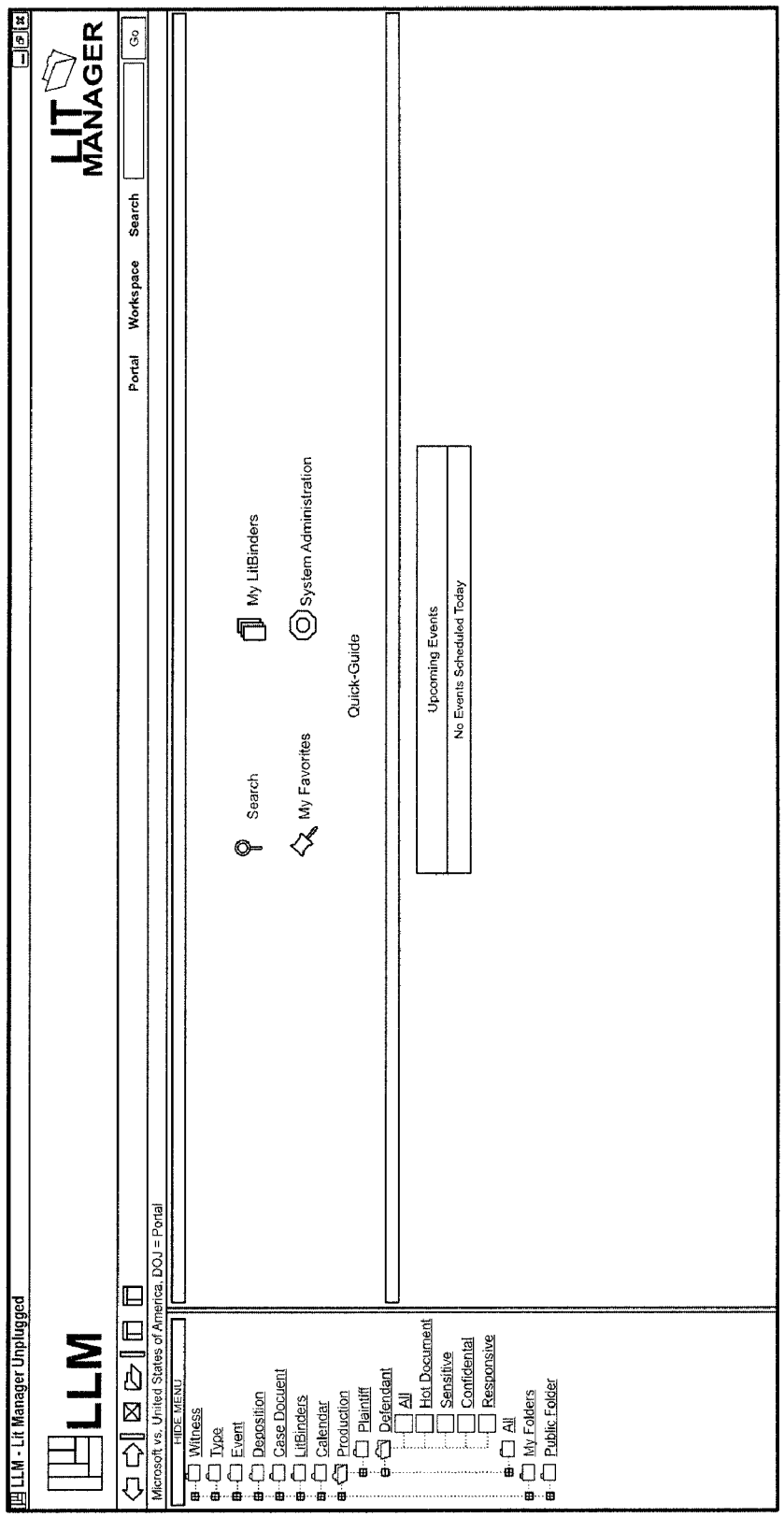

Initially, the user is displayed the screenshot as shown in FIG. 7C. Referring to FIG. 7C, the screenshot is of a graphical user interface (GUI) on the client. The GUI includes a menu tree in the navigation window (706). In this example, the user selects "Production-Defendant-All" node. Once the aforementioned node is selected, the following node list information is obtained.

Example 1A

Node List Information

1. NodeClasses=sProduction,mPlaintiffDefendant,sAll
2. NodeNames=Production,Defendant,All
3. NodeValues=1000103,1000038,0
4. Display Path: Flex&SourceDefinition=Production&View=13

Referring to Example 1A, NodeClasses refers to the type of information stored in the node, NodeNames refers to the lineage of parent nodes above the node to which the Node list information corresponds, NodeValues corresponds to the identification numbers, which uniquely identify each node, and the Display Path lists the source definition and preference settings associated with the node. In one embodiment of the invention, the NodeValues are used as primary keys in the query (see Example 1E). In one embodiment of the invention, the display path may be any Uniform Resource Locator (URL) type path.

Once the node list information is obtained, the source definition listed in the node list information is obtained. The following is the source definition referenced in the node information list shown in Example 1B.

Example 1B

Source Definition

```
<whereclauses>
  <conditional>
    <criterion value="sProduction">
      {{element1}}={{sProduction}}
    </criterion>
  </conditional>
  <conditional>
    <criterion value="mProductionSourceList">
      AND {{element18}}={{mProductionSourceList}}
    </criterion>
    <criterion value="mPlaintiffDefendant">
      AND {element28}}={{mPlaintiffDefendant}}
    </criterion>
  </conditional>
  <conditional>
    <criterion value="mFlagList">
      AND {{element27}}={{mFlagList}}
    </criterion>
  </conditional>
</whereclauses>
```

Referring to Example 1B, the source definition is an XML file that includes conditional rules (e.g., the "where" clause in SQL) used as restriction criteria in generating a query to find matching local case records. In the case of the present example, the restricting criteria, as defined in the source definition, restricts the matching local case records to all local case records from the local instance of the legal matter which are associated to the node "All".

Example 1C shows Layout settings to use to display the list of matching local case records.

Example 1C

Layout Settings

```
<Column id="1" headingtype="standard" headingtext="Description" sortable="true" databasesort="4" columntype="openhover" headingalign="left" columnalign="left" maxwidth="250">
{{element4}}
</Column>
<Column id="2" headingtype="standard" headingtext="Date" sortable="true" databasesort="5" columntype="date" headingalign="left" columnalign="left">
```

{{element5}}
</Column>
<Column id="3" headingtype="standard" headingtext="Parent" sortable="true" databasesort="43" columntype="complex" headingalign="left" columnalign="left"> <a class="DescriptionLink" href="GetPage.do?pagetarget=DocFrame&documentID={{element43}}">{{element43}}{{element50}}</a>
</Column>

Referring to Example 1C, the layout settings is an XML file used to define how to display each of the metadata tags associated with the matching local case records as well as the various properties each of the metadata tags may include when displayed. For example, the layout setting may indicate which of the metadata tags the user may use to store the displayed matching case records.

Example 1D shows Preference Settings associated with the node.

Example 1D

Preference Settings

Layout for the view="Production"
Allowed layout columns for the view: 0,1,2,3,4,5,6,7,8,9,10
Layout columns to display: 9,0,3,2,5
Sort on these elements: 0,2

Referring to Example 1D, the preference settings refer to which of metadata tag(s) associated with a local case record to display to the user (e.g., columns 9,0,2,3,5). As shown in Example 1D, preference settings may also include sorting information (e.g., "Sort on these elements: 0,2"). The sorting information is used to determine the order in which the matching local case records are displayed to the user.

Using the above source definition and preference settings, the following SQL query is generated.

Example 1E

SQL Query

SELECT DS.DOCUMENTID FROM DOCUMENTSTORAGE DS
LEFT JOIN RELATIVES RTYPE ON (RTYPE.DOCUMENTID=DS.DOCUMENTID AND RTYPE.RELATIVETYPEID=1)
LEFT JOIN RELATIVES PRODSRC ON (PRODSRC.DOCUMENTID=DS.DOCUMENTID AND PRODSRC.RELATIVETYPEID=13)
LEFT JOIN RELATIONSHIPS PRODSRCOR ON (PRODSRCOR.CHILDID=PRODSRC.RELATIVEID AND PRODSRCOR.RELATIONSHIPTYPE=4)
where
RTYPE.RELATIVEID=1000103
AND PRODSRCOR.PARENTID=1000038

The SQL query in Example 1E is subsequently executed to obtain a list of matching local case records. The matching local case records are then displayed to the user, via a GUI on the client, using the preference and layout settings to obtain the listing of local case records as shown in FIG. 7D.

The following discussion describes examples of one or more of the aforementioned embodiments of the invention. Those skilled in the art will appreciate that the following example is provided for exemplary purposes only and accordingly should not be construed as limiting the scope of the invention in any way.

Referring to FIG. 7A, initially a user logs onto the client via the authentication screen. As shown in FIG. 7A, the user authenticates herself to the client by providing a username (700) and password (702).

Referring to FIG. 7B, once the user has been authenticated, a drop down menu of a list of legal matters (704) is displayed to the user. The user may select a local instance of the legal matter from the list to view associated local case records. In one embodiment of the invention, the drop down menu only includes legal matters that the user has permission to access.

Referring to FIG. 7C, FIG. 7C shows the main screen displayed to the user once the user has selected a legal matter. As shown in FIG. 7C, the main screen includes a navigation screen (706) that provides a menu tree interface to navigate through the local case records organized within the menu tree and a display portion (708) that displays the selection made in the navigation screen (706).

Referring to FIG. 7D, once the user has selected the "All" node (710) in the navigation screen (706), the associated local case records (712) are displayed in a display portion (708) along with their associated metadata tag(s) (e.g., row (716), docID (718), description (720), date (722), headline (724), etc.). As discussed above, the particular metadata tag(s) displayed for each local case record are defined using the preference setting. Further, how each of the particular metadata tag(s) is displayed is defined using the layout settings. Returning to FIG. 7D, the client also displays the current navigation path (714) in the top portion of the main screen.

Figure 7E:
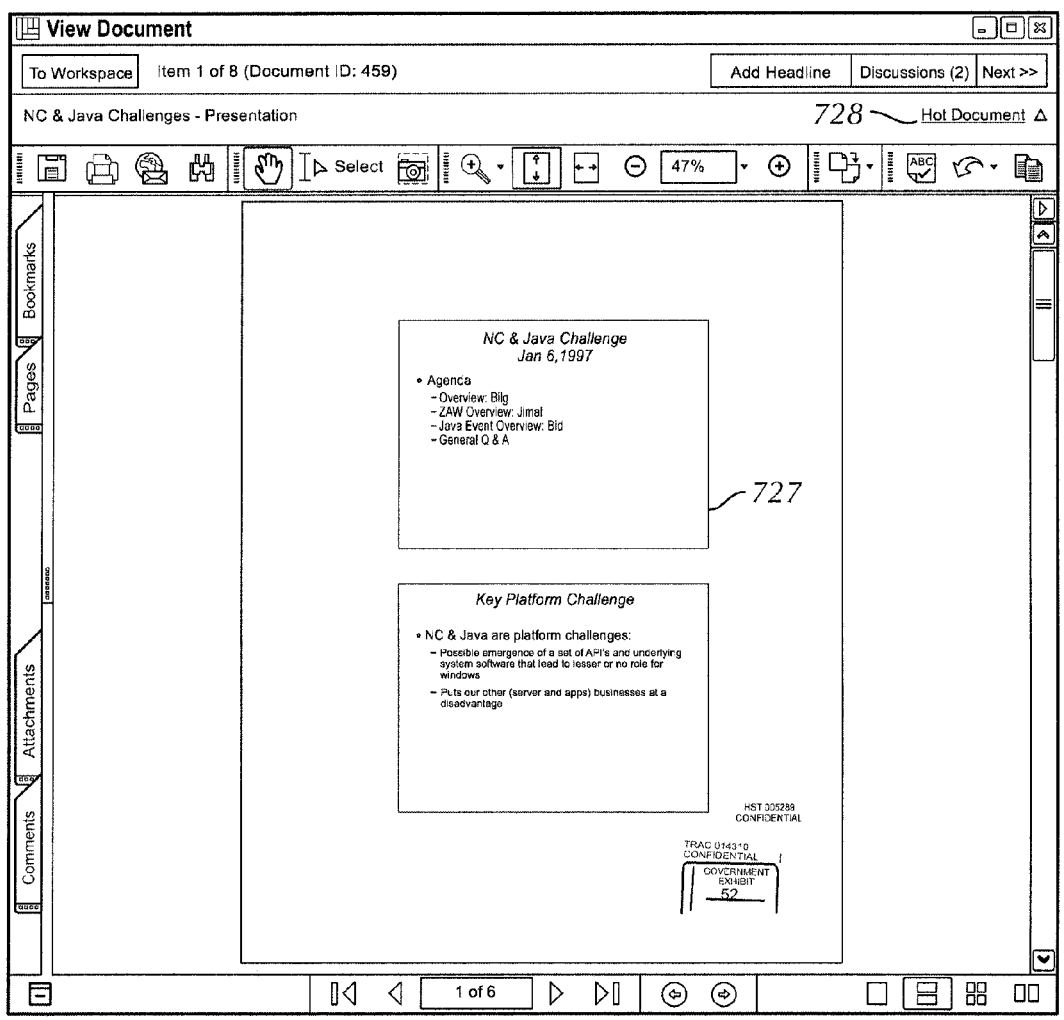

Referring to FIG. 7E, the user subsequently selects local case record 459 (726). The legal document (727) associated with the aforementioned local case record is subsequently retrieved and displayed. In addition, one or more metadata tag(s) may also be displayed (e.g., "hot document" (728)). At this point, the user may also click on the metadata tag to open, for example, a quick-note editor (FIG. 7F).

Figure 7F:
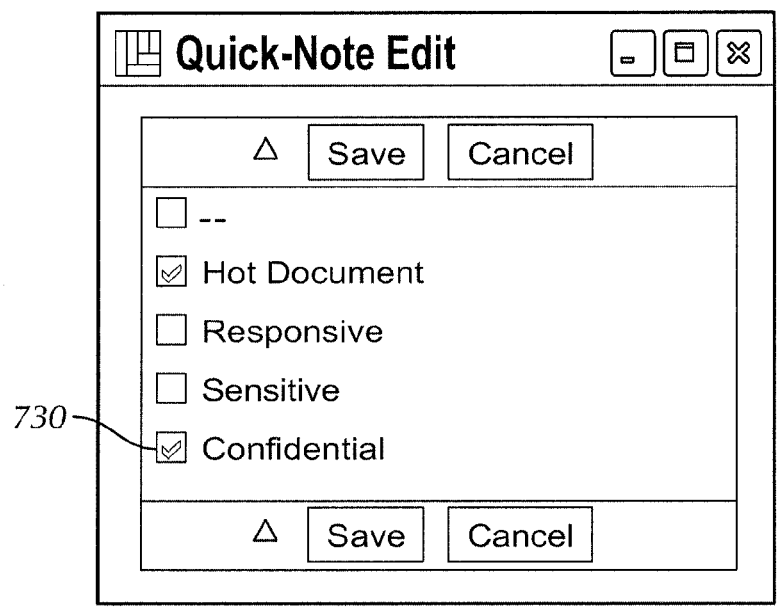

Referring to FIG. 7F, the quick-note editor allows the user associate one or more metadata tags. In FIG. 7F, quick-note editor is used to add the additional metadata tag of "confidential" to the case record 459 (726 in FIG. 7E).

Figure 7G:
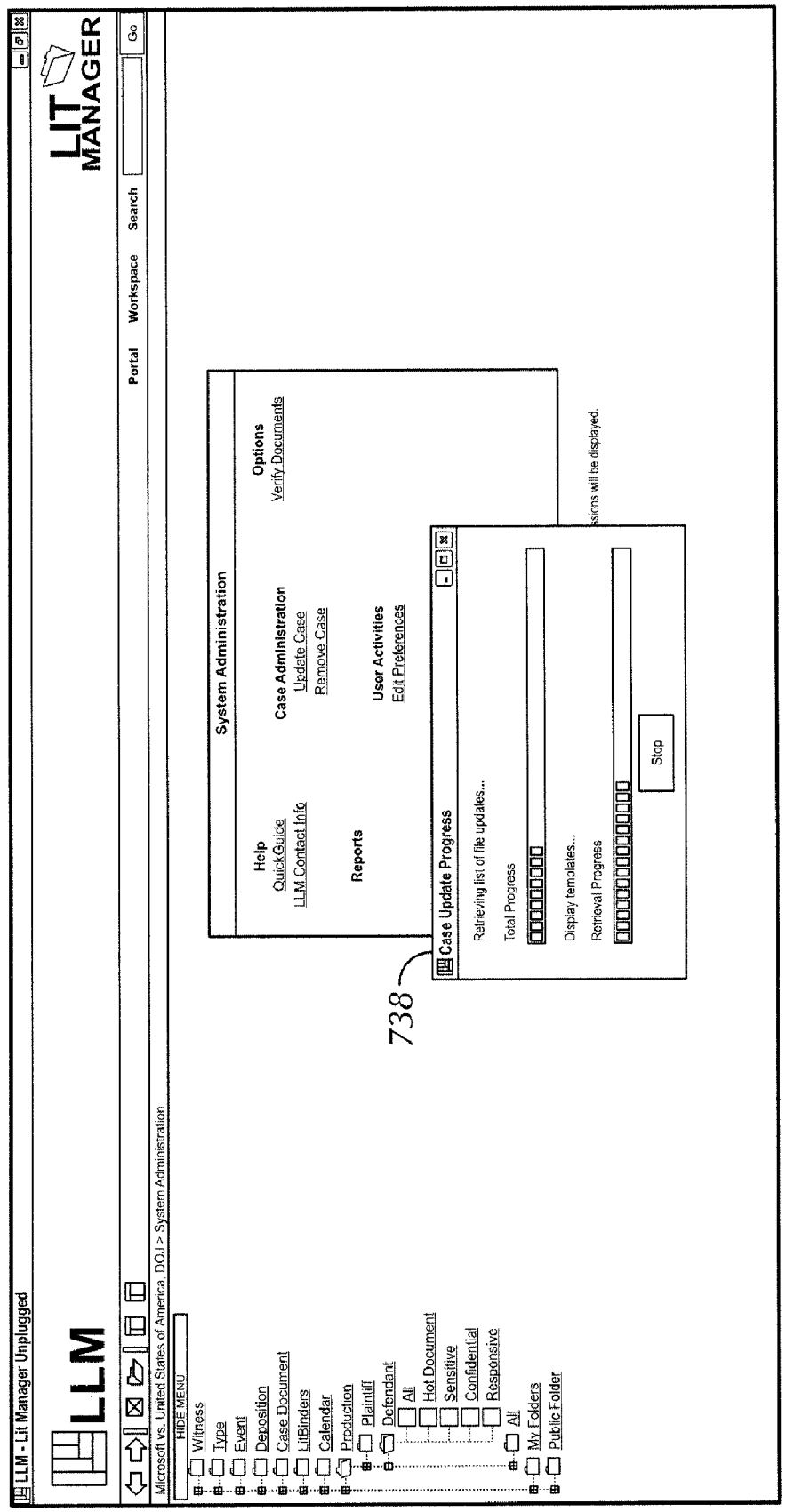

Referring to FIG. 7G, the user subsequently connects to the web server (e.g., 110 in FIG. 1) to synchronize the local case records with the corresponding web case records. As shown in FIG. 7G, a "case update progress" (738) window appears to show the status of synchronization between the local instance and the web instance of the legal matter.

Figure 7H:
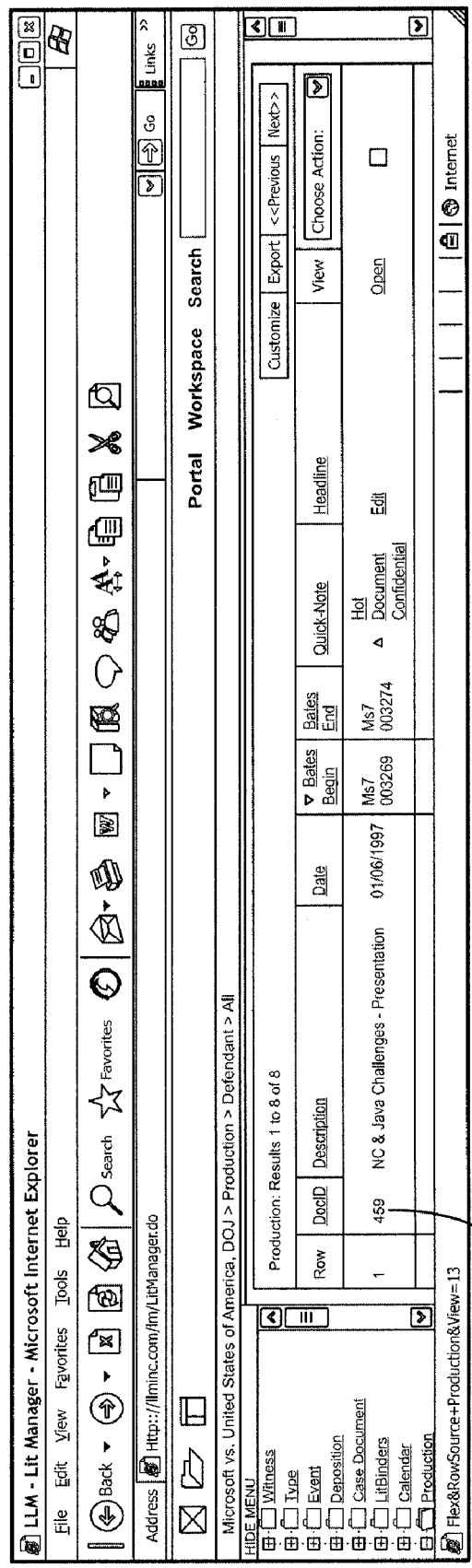
Figure 71:
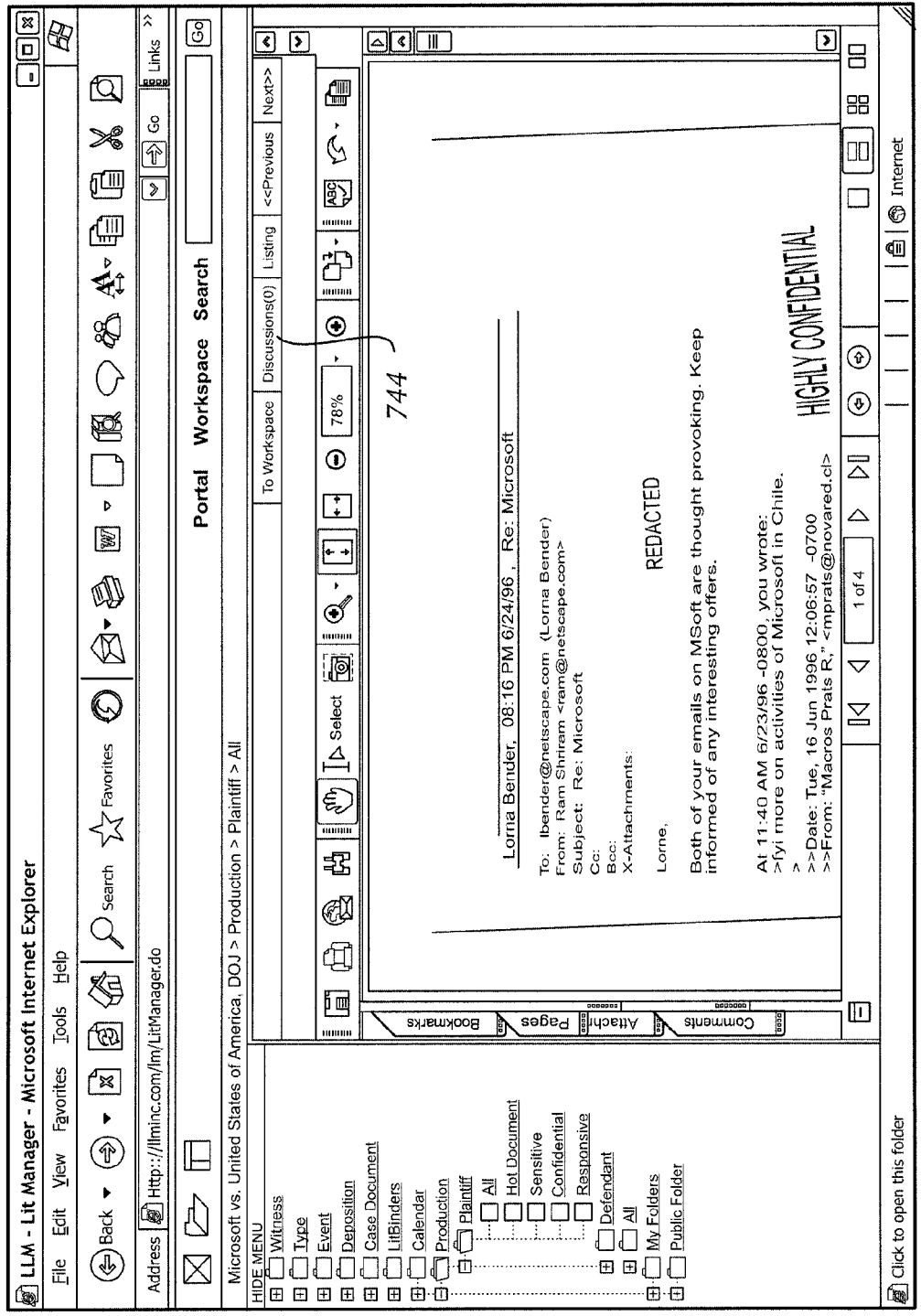

Referring to FIG. 7H, after the synchronization is complete, that changes made to local case record 459 (726) are now reflected in the corresponding web case record. Specifically, the corresponding web case record (740) includes two quick notes "confidential" and "hot document" (742). Further details regarding the web version may be obtained by referring to U.S. Patent Application Publication Number 2005/0166139.

Figure 7J:
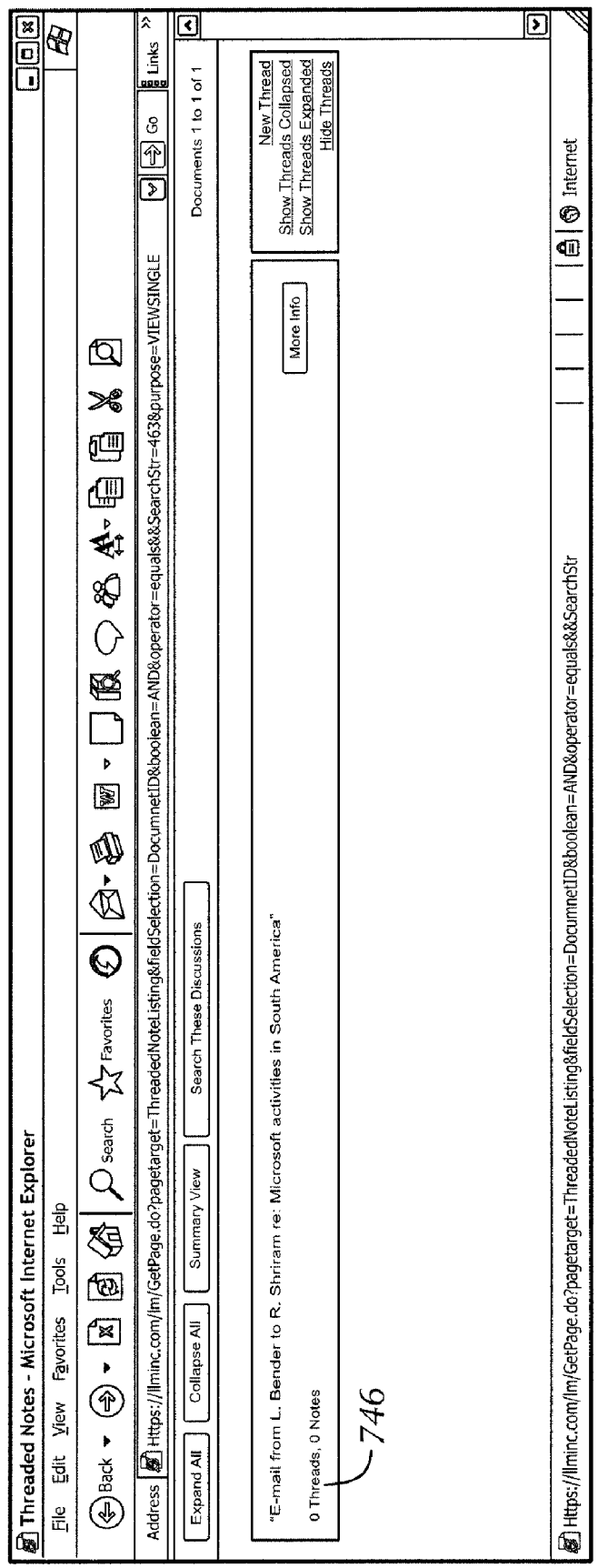
Figure 7K:
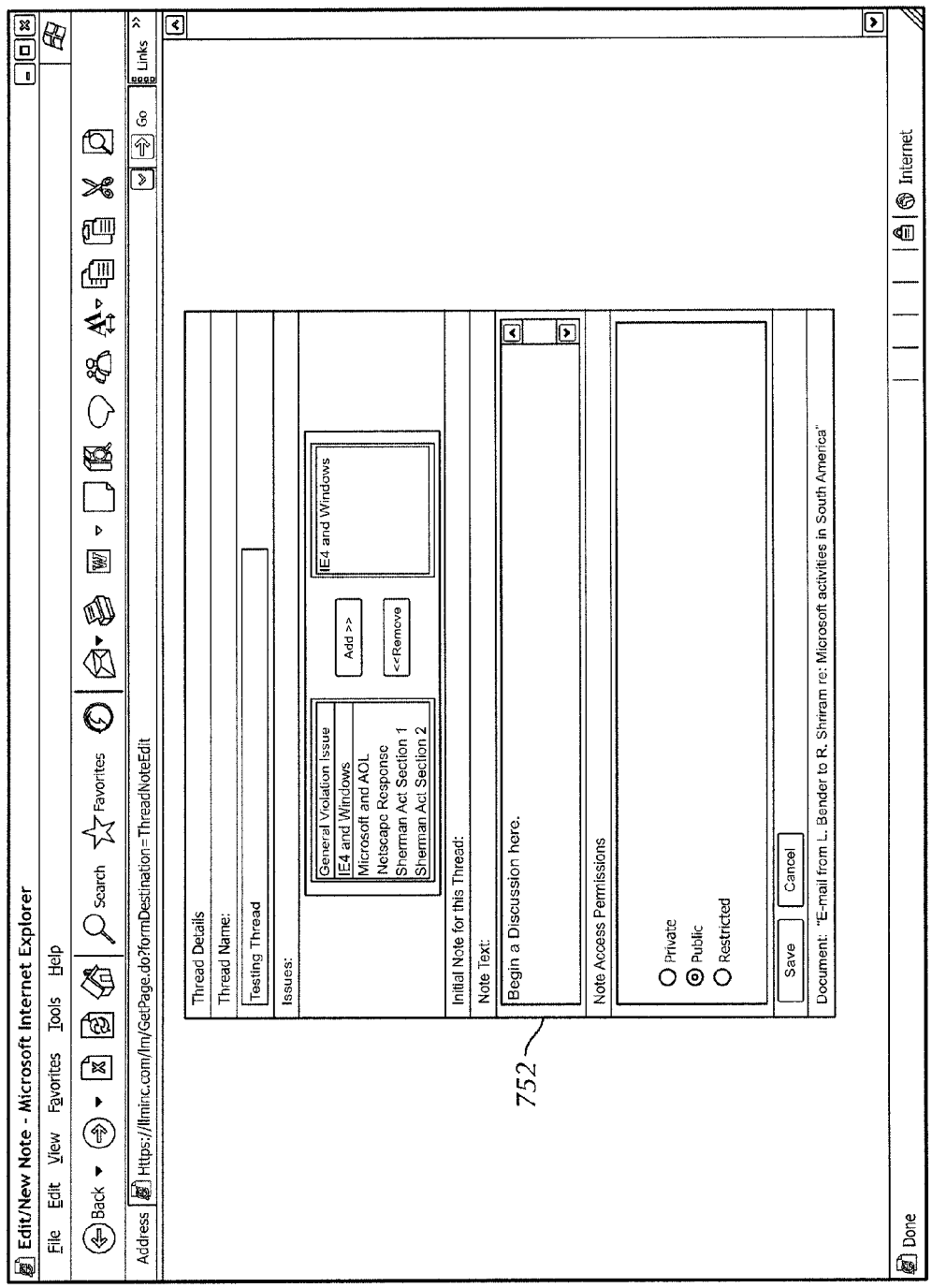
Figure 7L:
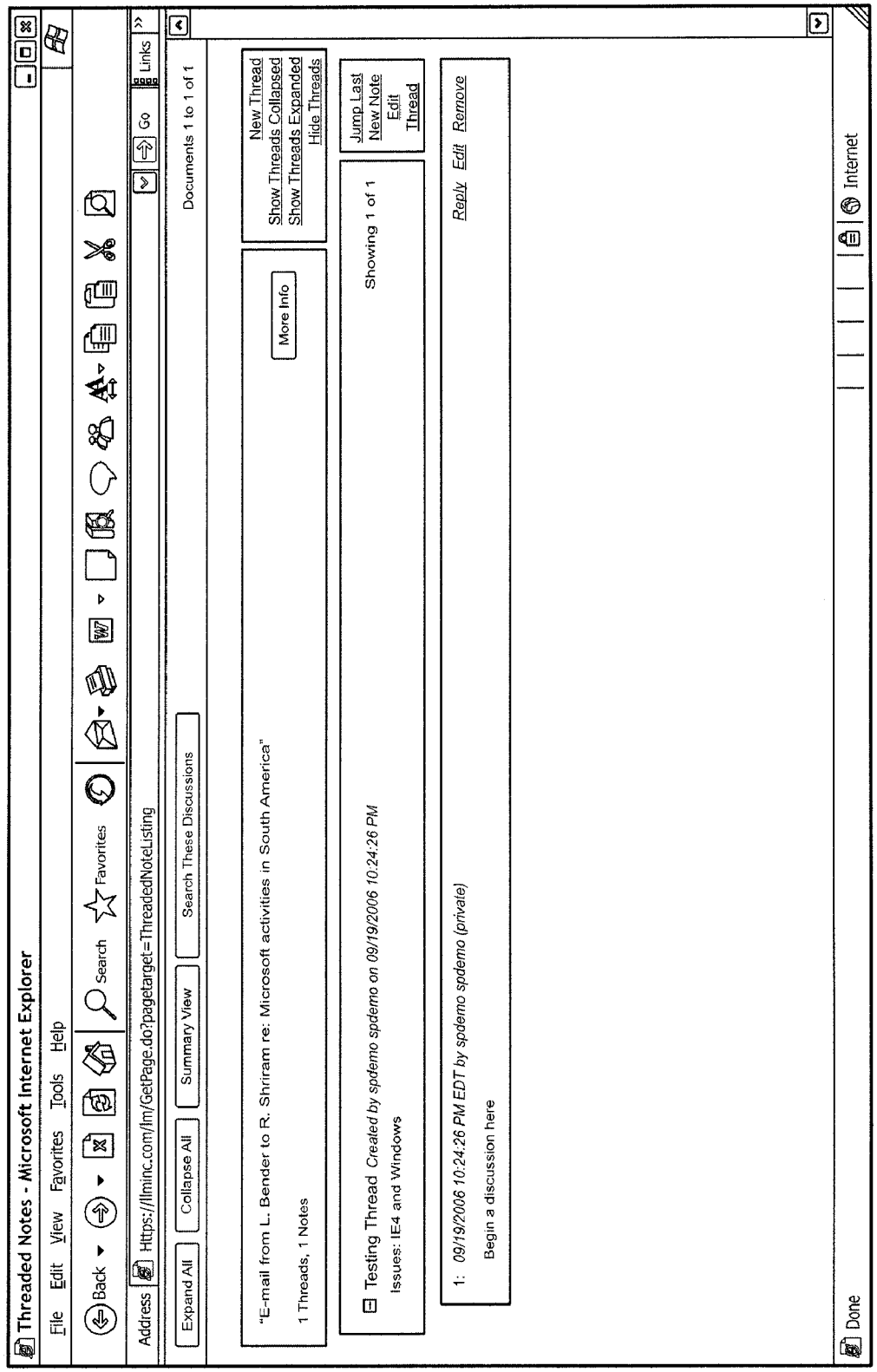

Referring to FIG. 7I, the user subsequently opens web case record 436 and selects the "Discussions" button (744). Referring to FIG. 7J, upon clicking on the "Discussion" button (744), a listing of all discussions associated with web case record 436 are displayed. As shown in FIG. 7J no threads/notes (746) exist for web case record 436. The user subsequently creates a new thread using the window (752) shown in FIG. 7K. FIG. 7L shows the thread (754) created using the window (752) in FIG. 7J.

Figure 7M:
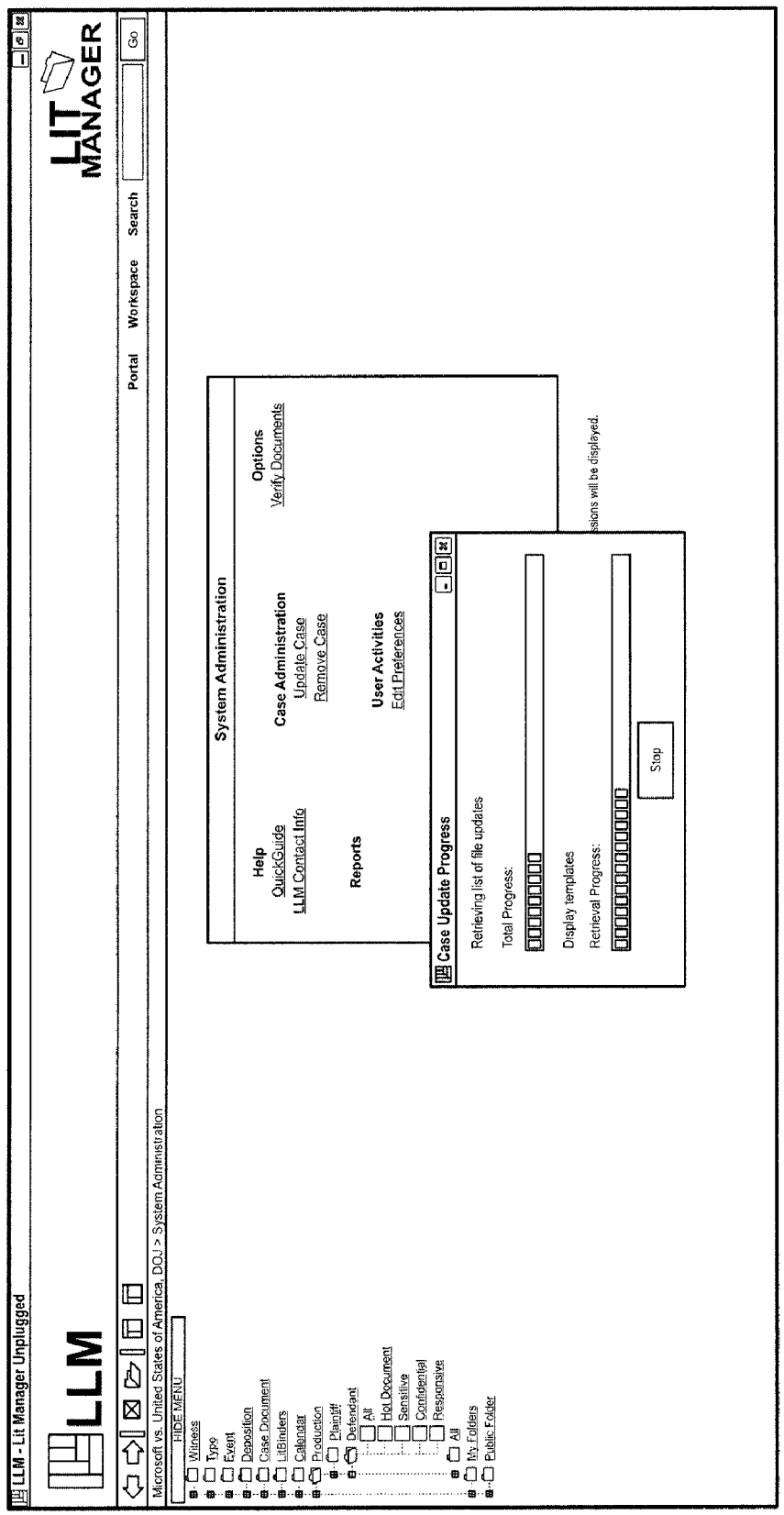
Figure 7N:
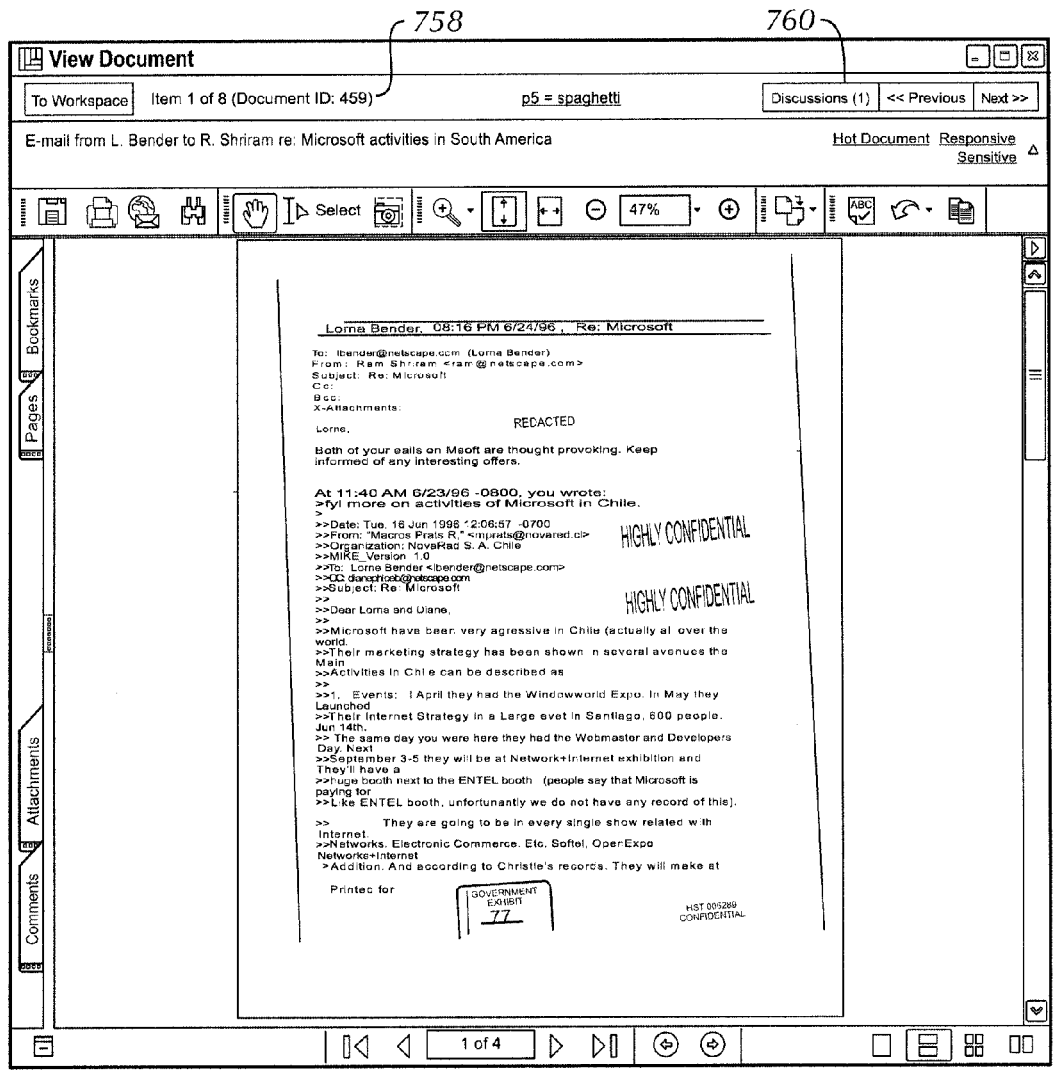

Referring to FIG. 7M, sometime after the new thread (754) is created in the web case record, a client synchronizes with the web server. Referring to FIG. 7N, after the synchronization, the user of the client opens local case record 463 (758). As shown in FIG. 7N, the local case record now reflects that a discussion is associated with local case record 463 ("758"). The user subsequently selects the "Discussion" button (760) displayed on the GUI of the client.

Referring to FIG. 7O, in response to the selection, the GUI of the client displays the thread and note (762) previously entered by another user (or the same user) via the web case record. The user then adds an additional note (764) to the local case record as shown in FIG. 7P. At this stage, the local case record is associated with two notes and the corresponding web case record is associated with only one note. The local instance and the web instance may then by re-synchronized such that the corresponding web case record is associated with two notes.

Figure 8:
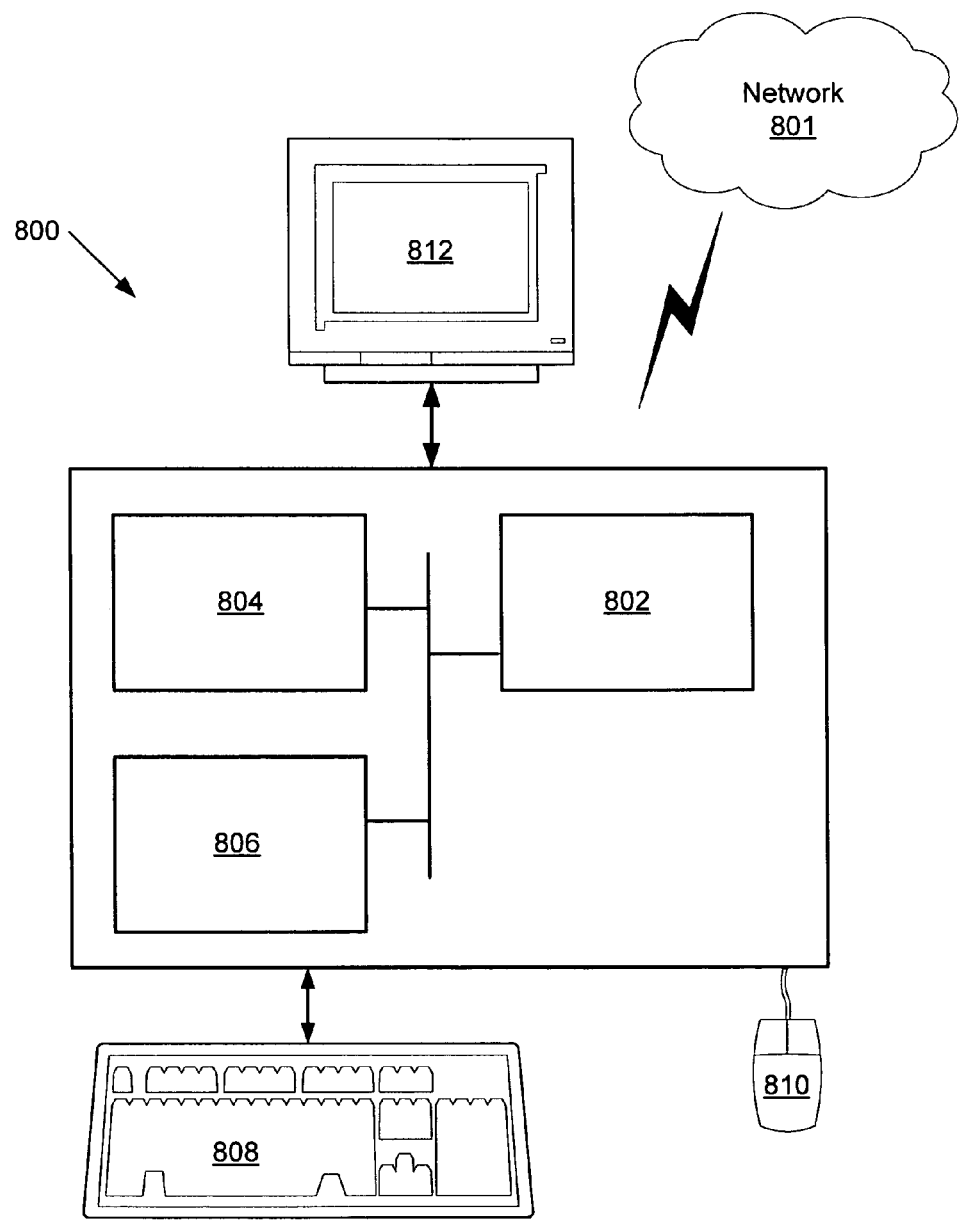
FIG. 8 shows a computer system in accordance with one or more embodiments of the invention.

Embodiments of the invention may be implemented on virtually any type of computer regardless of the platform being used. For example, as shown in FIG. 8, a computer system (800) includes a processor (802), associated memory (804), a storage device (806), and numerous other elements and functionalities typical of today's computers (not shown). The computer (800) may also include input means, such as a keyboard (808) and a mouse (810), and output means, such as a monitor (812). The computer system (800) may be connected to a network (801) (e.g., a local area network (LAN), a wide area network (WAN) such as the Internet, or any other similar type of network) via a network interface connection (not shown). Those skilled in the art will appreciate that these input and output means may take other forms.

Further, those skilled in the art will appreciate that one or more elements of the aforementioned computer system (800) may be located at a remote location and connected to the other elements over a network. Further, embodiments of the invention may be implemented on a distributed system having a plurality of nodes, where each portion of the invention (e.g., web data repository, web server, customization engine, local data repository, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A client device, comprising:
a local data repository comprising a plurality of local case records associated with a local instance of a legal matter;
a customization engine configured to display at least one of the plurality of local case records; and
a synchronization engine configured to synchronize the local instance of the legal matter with a corresponding web instance of the legal matter to obtain a synchronized master web instance of the legal matter, wherein the web instance of the legal matter is located in a web data repository operatively connected to the client device comprising a plurality of web case records associated with the web instance of the legal matter, and wherein both the web instance and the local instance of the legal matter are reviewed by a plurality of users,
wherein the synchronization engine is further configured to synchronize the local instance with the corresponding web instance by:
obtaining a last synchronization time for the local instance of the legal matter, wherein the last synchronization time corresponds to a time on the client when synchronization is completed,
obtaining a current synchronization time for the local instance of legal matter, wherein the current synchronization time corresponds to a time on the client when synchronization is started,
obtain all changes made to the corresponding web instance between the last and current synchronization times,
obtain all changes made to the local instance between the last and current synchronization times, and
analyze the changes made to the web instance and the local instance of the legal matter to resolve collisions using a collision resolution scheme comprising a plurality of rules,
wherein the plurality of rules indicate a prevailing action when at least two actions collide, wherein each of the at least two actions are selected from a group consisting of modifying a metadata tag of a local case record, deleting a local case record, inserting a local case record, modifying a metadata tag of a web case record, deleting a web case record, inserting a web case record,
wherein, after synchronization is complete, the synchronized master web instance is stored in the web data repository and configured to be downloaded by the client device as an updated local instance when any one of the plurality of users reviews the synchronized web instance.

2. The client device of claim 1, wherein the customization engine is configured to display:
the at least one of the plurality of local case records using a layout setting, and
the at least one of the plurality of local case records using a preference setting,
wherein the layout setting comprises at least one selected from a group consisting of formatting information for the at least one of the plurality of local case records and sorting information for the at least one of the plurality of local case records.

3. The client device of claim 2, wherein the preference setting specifies which of a plurality of metadata tags associated with the at least one of the plurality of local case records to display.

4. The client device of claim 1, wherein the at least one of the plurality of local case records comprises a legal document and a metadata tag, wherein the metadata tag is one selected from a group consisting of party designation in the legal matter, a docket number of the at least one of the plurality of local case records, a court filing date of the at least one of the plurality of local case records, a quick-note associated with the at least one of the plurality of local case records, a description of the legal document associated with the at least one of the plurality of local case records, and a bates number of the legal document associated with the at least one of the plurality of local case records.

5. The client device of claim 1, wherein synchronizing the local instance of the legal matter with the web instance of the legal matter further comprises:
receiving a new case record from the web data repository; and updating the local instance of the legal matter to include the new case record.

6. The client device of claim 1, wherein synchronizing the local instance of the legal matter with the web instance of the legal matter further comprises:
sending an updated local case record to the web data repository, wherein the updated local case record is associated with a modified metadata tag.

7. The client device of claim 1, wherein synchronizing the local instance of the legal matter with the web instance of the legal matter further comprises:
receiving an updated web case record from the web data repository, wherein the updated web case record is associated with an updated metadata tag; and
updating the local instance of the legal matter to include the updated web case record.

8. The client device of claim 1, wherein synchronizing the local instance of the legal matter with the web instance of the legal matter further comprises:
receiving a notification of a deleted web case record;
deleting one of the plurality of local case records, wherein the one of the plurality of local case records corresponds to the deleted web case record; and
sending a notification of the deleted local case record to the web data repository.

9. The client device of claim 1, wherein synchronizing the local instance of the legal matter with the web instance of the legal matter further comprises:
sending a new local case record to the web data repository.

10. A method for managing legal documents comprising:
synchronizing a local instance of a legal matter on a client device with a corresponding web instance of the legal matter on a web data repository to obtain a synchronized local instance, wherein the web data repository comprises a plurality of web case records associated with the web instance of the legal matter, and wherein both the web instance and the local instance of the legal matter are reviewed by a plurality of users,
wherein the local instance is synchronized with the corresponding web instance to obtain a synchronized master web instance by:
obtaining a last synchronization time for the local instance of the legal matter, wherein the last synchronization time corresponds to a time on the client when synchronization is completed,
obtaining a current synchronization time for the local instance of legal matter, wherein the current synchronization time corresponds to a time on the client when synchronization is started,
obtain all changes made to the corresponding web instance between the last and current synchronization times,
obtain all changes made to the local instance between the last and current synchronization times, and
analyze the changes made to the web instance and the local instance of the legal matter to resolve collisions using a collision resolution scheme comprising a plurality of rules,
wherein the plurality of rules indicate a prevailing action when at least two actions collide, wherein each of the at least two actions are selected from a group consisting of modifying a metadata tag of a local case record, deleting a local case record, inserting a local case record, modifying a metadata tag of a web case record, deleting a web case record, inserting a web case record;

receiving a request by the client device, after synchronization is complete, to review the synchronized master web instance;
downloading an updated local instance of the legal matter corresponding to the synchronized master web instance onto the client device;
displaying at least one of a plurality of local case records in the updated local instance;
obtaining the at least one of the plurality of local case records; and
displaying the at least one of the plurality of local case records on the client device using a customization engine.

11. The method of claim 10, further comprising:
prior to synchronizing:
modifying a metadata tag associated with one of the plurality of local case records in the local instance of the legal matter to obtain an updated local case record.

12. The method of claim 10, further comprising:
obtaining a preference setting prior to displaying the at least one of the plurality of local case records, wherein the preference setting is used by the customization engine to display the at least one of the plurality of local case records.

13. The method of claim 12, wherein the preference setting specifies which of a plurality of metadata tags associated with the at least one of the plurality of local case records to display.

14. The method of claim 10, further comprising:
obtaining a layout setting prior to displaying the at least one of the plurality of local case records, wherein the layout setting is used by the customization engine to display the at least one of the plurality of local case records,
wherein the layout setting comprises at least one selected from a group consisting of formatting information for the at least one of the plurality of local case records and sorting information for the at least one of the plurality of local case records.

15. The method of claim 10, wherein the at least one of the plurality of local case records comprises a legal document and a metadata tag, wherein the metadata tag is one selected from a group consisting of party designation in the legal matter, a docket number of the at least one of the plurality of local case records, a court filing date of the at least one of the plurality of local case records, a quick-note associated with the at least one of the plurality of local case records, a description of the legal document associated with the at least one of the plurality of local case records, and a bates number of the legal document associated with the at least one of the plurality of local case records.

16. The method of claim 10, wherein synchronizing the local instance of the legal matter with the web instance of the legal matter further comprises:
sending the updated local case record to the web data repository, wherein the updated local case record is associated with a modified metadata tag.

17. The method of claim 10, wherein synchronizing the local instance of the legal matter with the web instance of the legal matter further comprises:
receiving a new case record from the web data repository; and
updating the local instance of the legal matter to include the new case record.

18. The method of claim 10, wherein synchronizing the local instance of the legal matter with the web instance of the legal matter further comprises:

receiving an updated web case record from the web data repository, wherein the updated web case record is associated with an updated metadata tag; and updating the local instance of the legal matter to include the updated web case record.

19. The method of claim 10, wherein synchronizing the local instance of the legal matter with the web instance of the legal matter further comprises:

receiving a notification of a deleted web case record;

deleting one of the plurality of local case records, wherein the one of the plurality of local case records corresponds to the deleted web case record; and sending a notification of a deleted local case record to the web data repository.

20. The method of claim 10, wherein synchronizing the local instance of the legal matter with the web instance of the legal matter further comprises:

sending a new local case record to the web data repository.

* * * * *